United States Patent
Ishioka et al.

(10) Patent No.: US 9,166,244 B2
(45) Date of Patent: Oct. 20, 2015

(54) FUEL CELL

(75) Inventors: Atsushi Ishioka, Wako (JP); Hiroki Homma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 489 days.

(21) Appl. No.: 13/575,074

(22) PCT Filed: Mar. 3, 2011

(86) PCT No.: PCT/JP2011/055561
§ 371 (c)(1),
(2), (4) Date: Jul. 25, 2012

(87) PCT Pub. No.: WO2011/114971
PCT Pub. Date: Sep. 22, 2011

(65) Prior Publication Data
US 2012/0295182 A1  Nov. 22, 2012

(30) Foreign Application Priority Data
Mar. 15, 2010 (JP) ................................. 2010-058316

(51) Int. Cl.
*H01M 8/04* (2006.01)
*H01M 8/24* (2006.01)
*H01M 8/02* (2006.01)
*H01M 8/12* (2006.01)

(52) U.S. Cl.
CPC .......... *H01M 8/2425* (2013.01); *H01M 8/0258* (2013.01); *H01M 8/248* (2013.01); *H01M 8/2475* (2013.01); *H01M 2008/1293* (2013.01); *Y02E 60/50* (2013.01); *Y02E 60/525* (2013.01)

(58) Field of Classification Search
None
See application file for complete search history.

(56) References Cited

U.S. PATENT DOCUMENTS

| | | | |
|---|---|---|---|
| 8,197,985 | B2 | 6/2012 | Homma |
| 2009/0004519 | A1 | 1/2009 | Vitella et al. |
| 2009/0081521 | A1 | 3/2009 | Yamamoto |
| 2010/0119907 | A1 | 5/2010 | Shibata et al. |
| 2010/0178593 | A1* | 7/2010 | Kiyohiro ........................ 429/513 |
| 2011/0039182 | A1* | 2/2011 | Dan et al. ....................... 429/456 |
| 2011/0053019 | A1 | 3/2011 | Takahashi |

(Continued)

FOREIGN PATENT DOCUMENTS

| | | |
|---|---|---|
| JP | 05-129033 | 5/1993 |
| JP | 10-172594 | 6/1998 |

(Continued)

OTHER PUBLICATIONS

US Office Action dated Oct. 6, 2014, U.S. Appl. No. 13/575,076.

(Continued)

*Primary Examiner* — Patrick Ryan
*Assistant Examiner* — Lucas J O'Donnell
(74) *Attorney, Agent, or Firm* — Rankin, Hill & Clark LLP

(57) ABSTRACT

A fuel cell includes separators. A second plate of the separator includes a second circular disk section, a second elongated plate section, and a second rectangular section. A fuel gas supply passage extends through the second circular disk section. The second rectangular section has a fuel gas inlet for supplying a fuel gas to a fuel gas channel, an outer ridge, and a fuel gas outlet for discharging the fuel gas, and a detour path forming wall bent in a V-shape toward the fuel gas inlet. A fuel gas inlet is formed in the V-shaped inner area of the detour path forming wall.

7 Claims, 35 Drawing Sheets

(56) References Cited

U.S. PATENT DOCUMENTS

| | | |
|---|---|---|
| 2011/0123890 A1 | 5/2011 | Miyazawa |
| 2012/0295182 A1 | 11/2012 | Ishioka et al. |

FOREIGN PATENT DOCUMENTS

| | | |
|---|---|---|
| JP | 2004-327130 | 11/2004 |
| JP | 2007-026925 | 2/2007 |
| JP | 2007-073357 | 3/2007 |
| JP | 2007-080760 | 3/2007 |
| JP | 2008-123962 | 5/2008 |
| WO | 2008/020533 | 2/2008 |
| WO | 2008/099575 | 8/2008 |
| WO | 2009/044752 | 4/2009 |
| WO | 2009/093622 | 7/2009 |
| WO | 2009/096291 | 8/2009 |
| WO | 2009/119108 | 10/2009 |
| WO | 2009/133779 | 11/2009 |
| WO | WO 2009133780 A1 * | 11/2009 |
| WO | 2011/114972 | 9/2011 |

OTHER PUBLICATIONS

European Office Action dated Jul. 23, 2013, Application No. 11710048.7, 6 pages.

Notice of Allowance issued Jun. 23, 2015 in co-pending U.S. Appl. No. 13/575,076, 21 pages.

* cited by examiner

FUEL CELL

TECHNICAL FIELD

The present invention relates to a fuel cell formed by stacking an electrolyte electrode assembly between separators. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly (MEA). The electrolyte electrode assembly is interposed between separators (bipolar plates). In use, generally, predetermined numbers of the electrolyte electrode assemblies and the separators are stacked together to form a fuel cell stack.

In the fuel cell, in order to supply a fuel gas such as a hydrogen-containing gas and an oxygen-containing gas such as air to the anode and the cathode of the electrolyte electrode assembly, respectively, a fuel gas channel and an oxygen-containing gas channel are formed along surfaces of the separator.

For example, in a solid oxide fuel cell disclosed in Japanese Laid-Open Patent Publication No. 05-129033, as shown in FIG. 33, unit cells 1a and separators 2a are stacked alternately to form a fuel cell stack 3a. A plurality of air supply holes 4a and fuel supply holes 5a are formed alternately at one end of the separators 2a, and a plurality of air discharge holes 6a and fuel discharge holes 7a are formed alternately at the other end of the separators 2a. In the fuel cell stack 3a, the fuel and the air flow in parallel to each other in the same direction on both of front and back surfaces of the unit cells 1a.

In a flat plate type solid oxide fuel cell disclosed in Japanese Laid-Open Patent Publication No. 10-172594, as shown in FIG. 34, unit cells 1a and separators 1b are provided alternately, gas supply holes 2b and gas discharge holes 3b extend through four corners of the separator 1b in the stacking direction, and a plurality of gas flow grooves 4b are formed on both surfaces of each separator 1b.

The gas from the gas supply hole 2b flows through a triangular recess 5b, and flows into the gas flow grooves 4b. A gas inlet is formed in an area close to the gas supply hole 2b of the triangular recess 5b. In the gas inlet, at least one of a throttle section 6b and blocks 7b is provided. The throttle section 6b and the blocks 7b function to increase the pressure loss in the gas flowing from the gas supply hole 2b.

In the stack structure adopted in a flat type solid oxide fuel cell disclosed in Japanese Laid-Open Patent Publication No. 2007-026925, as shown in FIG. 35, a plurality of flat type unit cells 1c and separators 2c are stacked together alternately. The separator 2c is formed by stacking a center plate 3c, a fuel electrode plate 4c, and an air electrode plate 5c.

A fuel gas supply flow field 6c is formed on a surface of the center plate 3c, and a plurality of fuel gas injection through holes 7c are formed in the fuel electrode plate 4c. The fuel gas injection through holes 7c are connected to the fuel gas supply flow field 6c. An oxygen-containing gas supply flow field 8c is formed on the back surface of the center plate 3c. A plurality of oxygen-containing gas injection through holes 9c are provided in the air electrode plate 5c. The oxygen-containing gas injection through holes 9c are connected to the oxygen-containing gas supply flow field 8c.

SUMMARY OF INVENTION

In Japanese Laid-Open Patent Publication No. 05-129033, the air supply holes 4a, the fuel supply holes 5a, the air discharge holes 6a, and the fuel discharge holes 7a are formed on sides of the separators 2a. In the structure, when the total sectional areas in the openings of the gas passages (gas supply holes and gas discharge holes) are the same, variations (non-uniform flow velocity, non-uniform flow rate) in the supply of the air and the fuel gas occur due to the production tolerance of the holes. Therefore, the desired power generation reaction cannot be performed.

Further, since seal packings are provided as seals for preventing leakage of gases in the unit cells 1a and the separators 2a, an excessively large load is applied to the MEAs of the unit cells 1a, and as a result, for example, the MEAs may be cracked or damaged undesirably. In particular, in terms of the necessity of putting a priority on the sealing performance to prevent gas leakage, an excessively large load is applied to the MEAs.

Further, in Japanese Laid-Open Patent Publication No. 10-172594, the gas inlet is provided in the area extending from the gas supply hole 2b to the triangular recess 5b. In the gas inlet, the throttle section 6b and the blocks 7b are provided. In the structure, a substantially large portion in the surface of the separator 1b does not contribute to the power generation. Therefore, the space in the separator 1b cannot be used efficiently, and reduction in the overall size of the fuel cell cannot be achieved easily.

Further, since sealing structure for preventing gas leakage is adopted, an excessively large load is applied to the MEAs, and as a result, for example, the MEAs may be cracked or damaged undesirably.

Further, in Japanese Laid-Open Patent Publication No. 2007-026925, the fuel gas injection through holes 7c are formed. In the case where the fuel gas injection through holes 7c have the same cross sectional area in the openings, variations in the supply of the fuel gas occur due to the production tolerance of the fuel gas injection through holes 7c. Therefore, the fuel gas cannot be uniformly distributed or supplied to the entire power generation surfaces of the unit cells 1c.

Further, in consideration of the sealing performance for preventing gas leakage, an excessively large load is applied to the MEAs, and as a result, for example, the MEAs may be cracked or damaged undesirably.

The present invention has been made to solve the problems of this type, and an object of the present invention is to provide a fuel cell having simple and compact structure in which no variations occur in the supply of the reactant gas, and it is possible to supply the reactant gas to the entire power generation surface uniformly.

The present invention relates to a fuel cell formed by stacking an electrolyte electrode assembly between separators. The electrolyte electrode assembly includes an anode, a cathode, and an electrolyte interposed between the anode and the cathode.

Each of the separators includes a rectangular sandwiching section for sandwiching the electrolyte electrode assembly, a bridge connected to the sandwiching section, and a reactant gas supply section connected to the bridge. The sandwiching section has a fuel gas channel for supplying a fuel gas along an electrode surface of the anode and an oxygen-containing gas channel for supplying an oxygen-containing gas along an electrode surface of the cathode separately. A reactant gas supply channel is formed in the bridge for supplying the fuel gas to the fuel gas channel or supplying the oxygen-containing gas to the oxygen-containing gas channel. A reactant gas supply passage extends through the reactant gas supply section in the stacking direction for supplying the fuel gas or the oxygen-containing gas to the reactant gas supply channel.

The sandwiching section includes at least one reactant gas inlet for supplying the fuel gas to the fuel gas channel or supplying the oxygen-containing gas to the oxygen-containing gas channel, an outer ridge protruding toward the fuel gas channel to contact an outer edge of the anode or protruding toward the oxygen-containing gas channel to contact an outer edge of the cathode, a reactant gas outlet for discharging the fuel gas after partially consumed in the fuel gas channel or discharging the oxygen-containing gas after partially consumed in the oxygen-containing gas channel, and at least one detour path forming wall contacting the anode or the cathode. The detour path forming wall is positioned between the reactant gas inlet and the reactant gas outlet, and bent in a V-shape toward the reactant gas inlet for preventing the fuel gas or the oxygen-containing gas from flowing straight from the reactant gas inlet to the reactant gas outlet.

At least one reactant gas inlet is provided in a V-shaped inner area of the at least one detour path forming wall.

In the present invention, the tightening load in the stacking direction is not transmitted between the reactant gas supply section and the sandwiching sections sandwiching the electrolyte electrode assembly through the bridges. In the structure, the desired tightening load is applied to the electrolyte electrode assembly. Thus, with simple and compact structure, a relatively large load is applied to the portion requiring high sealing performance, and a relatively small load enough to allow the electrolyte electrode assembly to tightly contact the sandwiching sections is applied to the electrolyte electrode assembly. In the structure, the desired sealing performance is obtained in the reactant gas supply section, and damages of the electrolyte electrode assembly are prevented as much as possible. Moreover, power generation and current collection are performed efficiently.

Further, after the fuel gas is supplied from the fuel gas inlet to the fuel gas channel, blowing of the fuel gas to the outside is prevented through the outer edge formed in the sandwiching section. Thus, the fuel gas is utilized effectively in the power generation reaction, and improvement in the fuel utilization ratio is achieved advantageously.

Further, gases other than the fuel gas, such as the oxygen-containing gas and the exhaust gas do not flow around to the anode from the outside of the electrolyte electrode assembly. Therefore, degradation in the power generation efficiency due to oxidation of the anode is prevented, and improvement in the durability of the separator and the electrolyte electrode assembly is achieved easily.

Further, after the oxygen-containing gas is supplied from the oxygen-containing gas inlet to the oxygen-containing gas channel, blowing of the oxygen-containing gas to the outside is prevented through the outer edge formed in the sandwiching section. Thus, the oxygen-containing gas is utilized effectively in the power generation reaction, and improvement in the gas utilization ratio of the oxygen-containing gas (air utilization ratio) is achieved advantageously.

Further, gases other than the oxygen-containing gas, such as the fuel gas and the exhaust gas do not flow around to the cathode from the outside of the electrolyte electrode assembly. Thus, degradation in the power generation efficiency due to reduction at the cathode is prevented. Improvement in the durability of the separator and the electrolyte electrode assembly can be achieved easily.

Further, since the detour path forming wall contacts, e.g., the anode, the desired power collection is achieved. Moreover, since the fuel gas flows around in the fuel gas channel, the length of the time for which the fuel gas flows along the electrode surface of the anode is increased. Therefore, the fuel gas is utilized in the power generation reaction effectively, and improvement in the fuel utilization ratio is achieved advantageously.

Further, since the detour path forming wall contacts, e.g., the cathode, the desired power collection is achieved. Moreover, since the oxygen-containing gas flows around in the oxygen-containing gas channel, the length of the time for which the oxygen-containing gas flows along the electrode surface of the cathode is increased. Therefore, the oxygen-containing gas is utilized in the power generation reaction effectively, and improvement in the air utilization ratio is achieved advantageously.

Further, the detour path forming wall is provided between the reactant gas inlet and the reactant gas outlet, and bent toward the reactant gas inlet in a V-shape. In the structure, the number of reactant gas inlets that need to be produced with high precision is reduced significantly and economically. As in the case of providing a plurality of the reactant gas inlets, the reactant gas can be supplied along the electrode surface uniformly.

Further, since at least one reactant gas inlet is formed in the V-shaped inner area of the detour path forming wall, the reactant gas, e.g., the fuel gas flows around in the fuel gas channel, and flows along the electrode surface of the anode for a long period of time. Thus, it is possible to utilize the fuel gas effectively in the power generation reaction, and improvement in the fuel utilization ratio is achieved advantageously.

Further, the reactant gas, e.g., the oxygen-containing gas flows around in the oxygen-containing gas channel, and flows along the electrode surface of the cathode for a long period of time. Thus, it is possible to utilize the oxygen-containing gas effectively in the power generation reaction, and improvement in the air utilization ratio is achieved advantageously.

DESCRIPTION OF EMBODIMENTS

Figure 1:
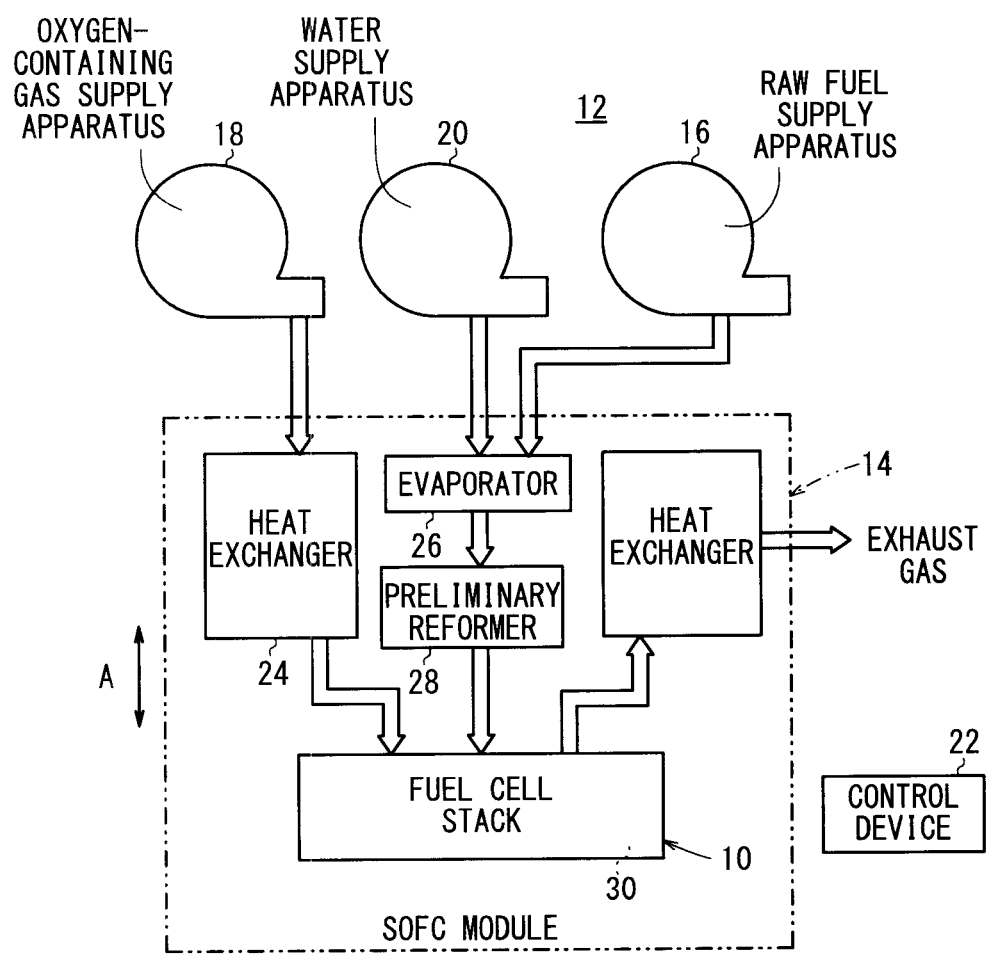
FIG. 1 is a view schematically showing structure of a fuel cell system including a fuel cell stack according to a first embodiment of the present invention.

As shown in FIG. 1, a fuel cell system 12 including a fuel cell stack 10 according to a first embodiment of the present invention is used in various applications, including stationary and mobile applications. For example, the fuel cell system 12 is mounted on a vehicle.

The fuel cell system 12 includes a fuel cell module (SOFC module) 14 for generating electrical energy in power generation by electrochemical reactions of a fuel gas (a gas produced by mixing hydrogen gas, methane, and carbon monoxide) and an oxygen-containing gas (air), a raw fuel supply apparatus (including a fuel gas pump) 16 for supplying a raw fuel (e.g., city gas) chiefly containing hydrocarbon to the fuel cell module 14, an oxygen-containing gas supply apparatus (including an air pump) 18 for supplying the oxygen-containing gas to the fuel cell module 14, a water supply apparatus (including a water pump) 20 for supplying water to the fuel cell module 14, and a control device 22 for controlling the amount of electrical energy generated in the fuel cell module 14.

The fuel cell module 14 includes a heat exchanger 24 for heating the oxygen-containing gas before the oxygen-containing gas is supplied to the fuel cell stack 10, an evaporator 26 for evaporating water to produce a mixed fuel of the raw fuel and the water vapor, and a preliminary reformer 28 for reforming the mixed fuel to produce a reformed gas.

The preliminary reformer 28 reforms higher hydrocarbons ($C_{2+}$) such as ethane ($C_2H_6$), propane ($C_3H_8$), and butane ($C_4H_{10}$) in the city gas to produce the raw fuel gas chiefly containing methane ($CH_4$) by steam reforming, and the preliminary reformer 28 is operated at an operating temperature of several hundred degrees Celsius.

In the heat exchanger 24, a reactant gas after partially consumed (hereinafter also referred to as the exhaust gas or the combustion exhaust gas) discharged from the fuel cell stack 10 and the air as a fluid to be heated flow in a counterflow manner for exchanging heat between the reactant gas and the air. After the heat exchange, the air is supplied to the fuel cell stack 10 as the oxygen-containing gas.

The water supply apparatus 20 and the raw fuel supply apparatus 16 are connected to the inlet of the evaporator 26, and the outlet of the evaporator 26 is connected to the inlet of the preliminary reformer 28. The outlet of the preliminary reformer 28 is connected to the fuel gas supply passage (described later) of the fuel cell stack 10.

Figure 2:
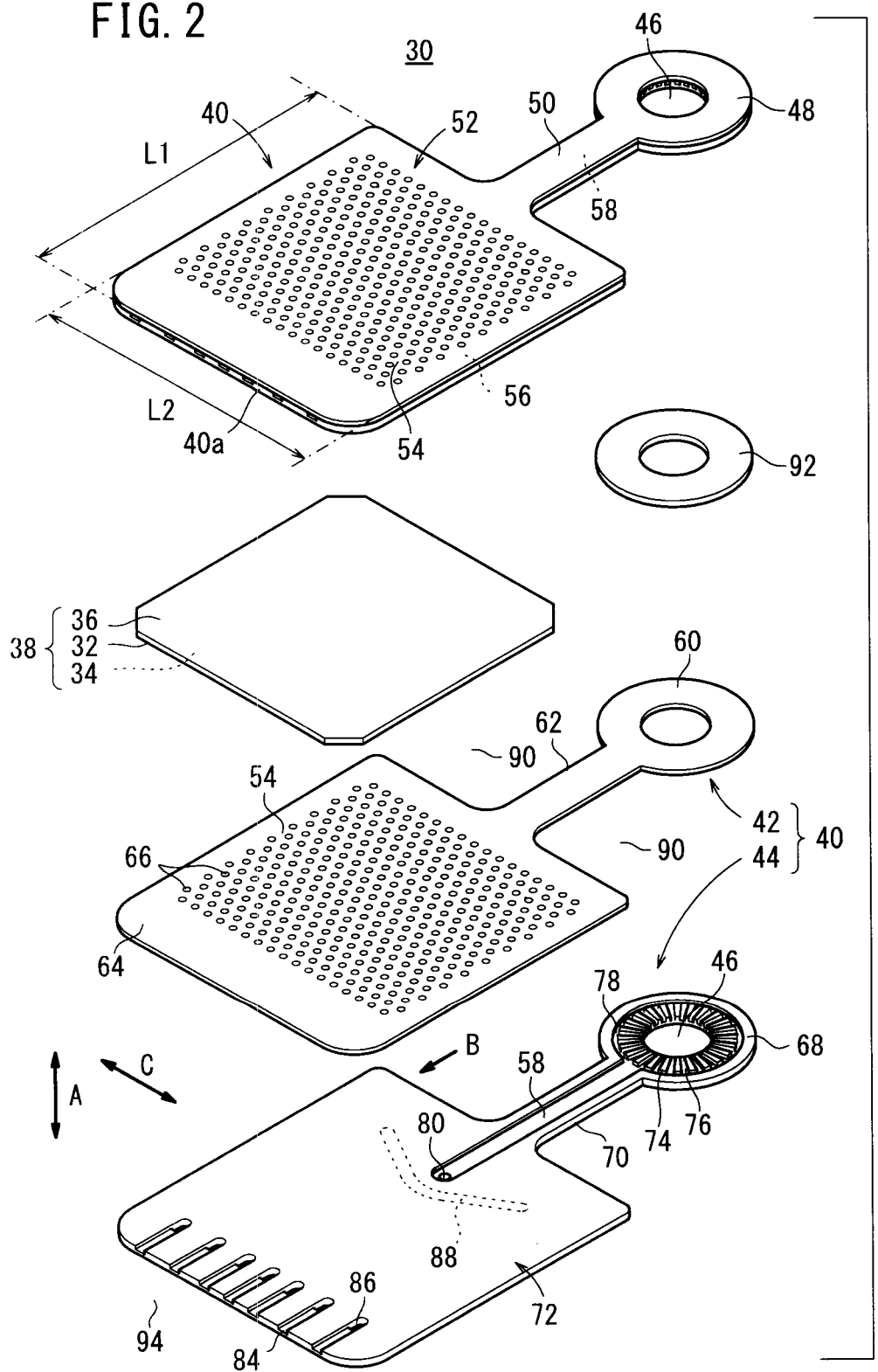
FIG. 2 is an exploded perspective view showing a fuel cell of the fuel cell stack.
Figure 3:
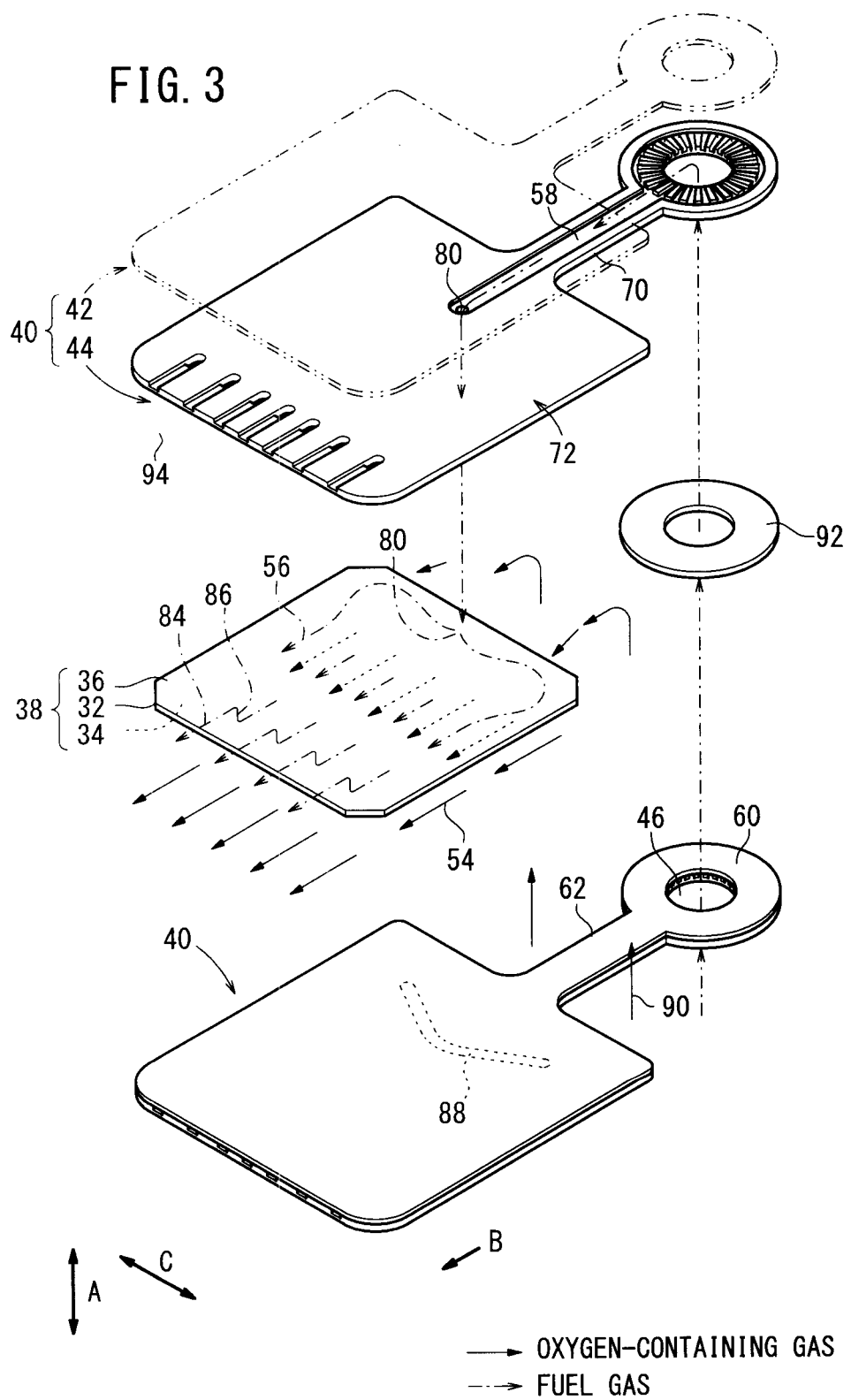
FIG. 3 is a partial exploded perspective view showing gas flows in the fuel cell.

The fuel cell stack 10 is formed by stacking a plurality of fuel cells 30 in a vertical direction indicated by an arrow A, and end plates (not shown) are provided at both ends of the fuel cell stack 10 in the stacking direction. As shown in FIGS. 2 and 3, the fuel cell 30 is a solid oxide fuel cell (SOFC). For example, the fuel cell 30 includes an electrolyte electrode assembly 38 (MEA). Each of the electrolyte electrode assemblies 38 includes a cathode 34, an anode 36, and an electrolyte (electrolyte plate) 32 interposed between the cathode 34 and the anode 36. For example, the electrolyte 32 is made of ion-conductive solid oxide such as stabilized zirconia.

The electrolyte electrode assembly 38 has a rectangular shape. A barrier layer (not shown) is provided at least at the outer edge of the electrolyte electrode assembly 38 for preventing the entry or discharge of the oxygen-containing gas and the fuel gas. The electrolyte electrode assembly 38 may have a square shape. Alternatively, the electrolyte electrode assembly 38 may have a rectangular shape where the length of the outer edge in parallel with an extension line of a bridge as described later is larger than the length of the outer edge perpendicular to the extension line of the bridge.

The fuel cell 30 is formed by sandwiching a single electrolyte electrode assembly 38 between a pair of separators 40. Each of the separators 40 includes a first plate 42 and a second plate 44. Each of the first plate 42 and the second plate 44 is a metal plate of, e.g., stainless alloy. The first plate 42 and the second plate 44 are joined to each other, e.g., by brazing, diffusion bonding, or laser welding.

The separator 40 has a fuel gas supply section (reactant gas supply section) 48, and a fuel gas supply passage (reactant gas supply passage) 46 extends through the center of the fuel gas supply section 48. A rectangular sandwiching section 52 is provided integrally with a bridge 50 extending outwardly from the fuel gas supply section 48. The sandwiching section 52 and the electrolyte electrode assembly 38 have substantially the same size. The length L1 of the outer edge in parallel with the extension line of the bridge 50 is larger than the length L2 of the outer edge perpendicular to the extension line (L1>L2).

The sandwiching section 52 has an oxygen-containing gas channel 54 on its surface which contacts the cathode 34, for supplying the oxygen-containing gas along an electrode surface of the cathode 34. Further, the sandwiching section 52 has a fuel gas channel 56 on its surface which contacts the anode 36, for supplying a fuel gas along an electrode surface of the anode 36 (see FIGS. 2 and 4). A fuel gas supply channel 58 is formed in the bridge 50 for supplying the fuel gas from the fuel gas supply passage 46 to the fuel gas channel 56.

The first plate 42 includes a first circular disk section 60, a first elongated plate section 62 formed integrally with the first circular disk section 60, and a first rectangular section 64 formed integrally with the first elongated plate section 62. The fuel gas supply passage 46 extends through the center of the first circular disk section 60. A plurality of projections 66 are formed on the surface of the first rectangular section 64 facing the cathode 34 to form the oxygen-containing gas channel 54.

The second plate 44 has a second circular disk section 68, a second elongated plate section 70 formed integrally with the second circular disk section 68, and a second rectangular section 72 formed integrally with the second elongated plate section 70. The fuel gas supply passage 46 extends through the center of the second circular disk section 68. On the surface of the second plate 44 to be joined to the first plate 42, a plurality of ridges 74 are arranged to form an annular shape in the second circular disk section 68, and slits 76 are formed between the ridges 74. The slits 76 are connected to one end of the fuel gas supply channel 58 through an annular groove 78. The fuel gas supply channel 58 extends from the second elongated plate section 70, and the other end of the fuel gas supply channel 58 is positioned in the middle of the second rectangular section 72.

Figure 4:
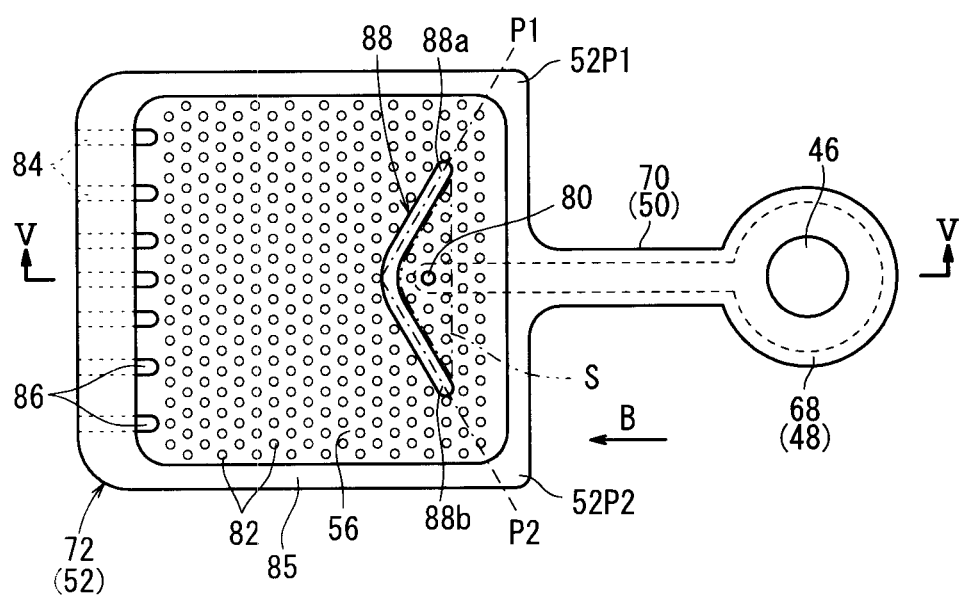
FIG. 4 is a view showing a second plate of the fuel cell.
Figure 5:
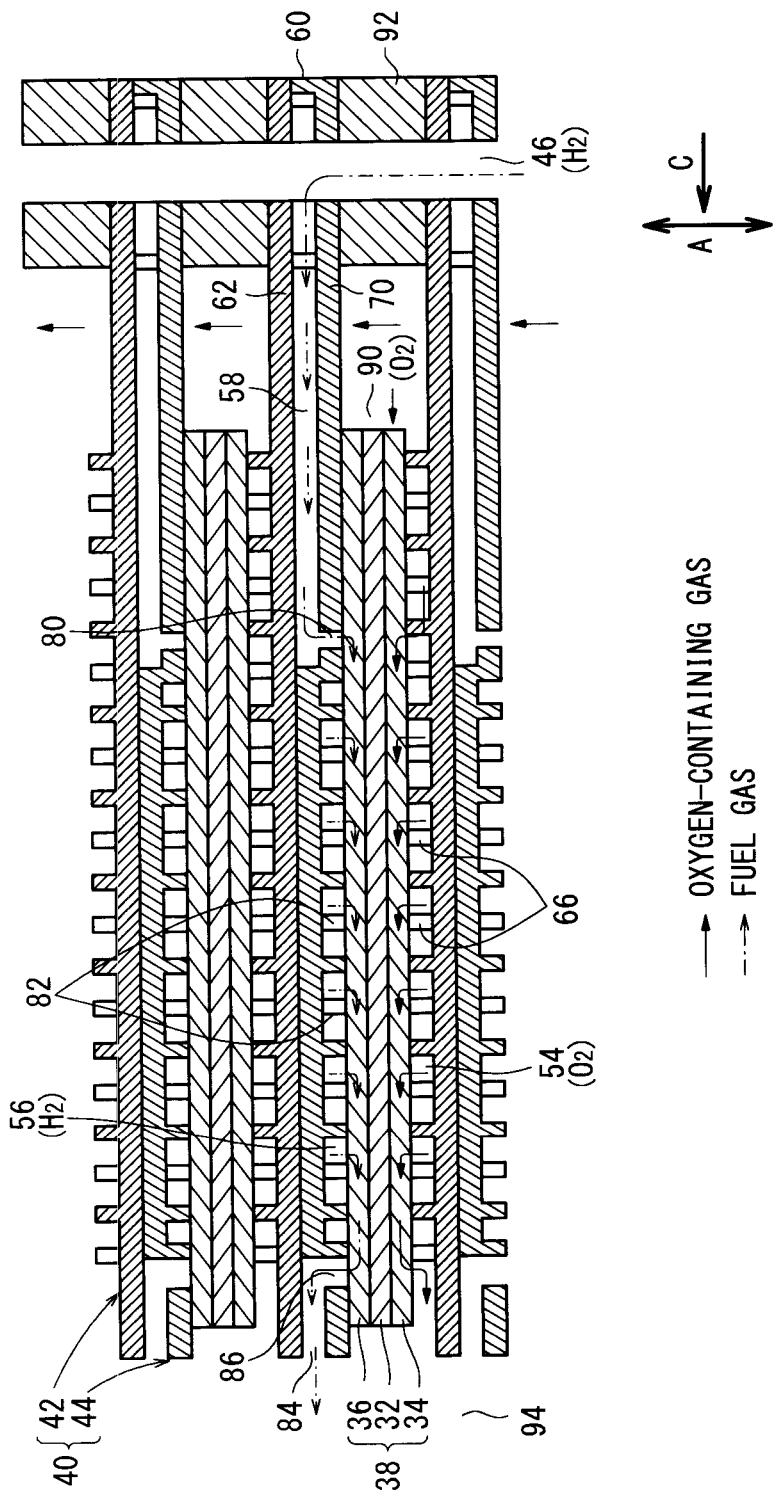
FIG. 5 is a cross sectional view showing the fuel cell, taken along a line V-V in FIG. 4.

A fuel gas inlet 80 is formed in the second rectangular section 72 adjacent to the position where the fuel gas supply channel 58 is terminated. As shown in FIG. 4, the fuel gas inlet 80 is provided on the upstream side of the flow direction of the oxygen-containing gas (described later) indicated by the arrow B, i.e., adjacent to the second elongated plate section 70.

A plurality of projections 82 forming the fuel gas channel 56 and an outer ridge 85 are formed on a surface of the second plate 44 which contacts the anode 36. The outer ridge 85 is formed around the fuel gas channel 56, and contacts the outer edge of the anode 36 (see FIG. 4).

Through holes 86 are formed at a front end of the second rectangular section 72. The through holes 86 are connected to fuel gas outlets 84 for discharging the fuel gas after partially consumed through the fuel gas channel 56. The through holes 86 are arranged in the direction intersecting the extension line of the second elongated plate section 70 (bridge 50). The fuel gas outlets 84 connected to the through holes 86 are arranged in a direction indicated by the arrow C, perpendicular to the extension line of the bridge 50, on one side 40a of the sandwiching section 52 (see FIG. 2).

As shown in FIG. 4, the second rectangular section 72 includes a detour path forming wall 88 between the fuel gas inlet 80 and the through holes 86 (fuel gas outlets 84). The detour path forming wall 88, contact the anode 36, is bent in a V shape toward the fuel gas inlet 80, and prevents the fuel gas from flowing straight from the fuel gas inlet 80 to the through holes 86.

The fuel gas inlet 80 is provided in an inner area S of the V-shaped detour path forming wall 88. The detour path forming wall 88 is configured such that extension lines P1, P2 of both ends 88a, 88b are oriented toward both corners 52P1, 52P2 of the sandwiching section 52.

As shown in FIGS. 2 and 3, oxygen-containing gas supply passages 90 are formed on both sides of the bridge 50, for allowing the oxygen-containing gas to flow in the direction indicated by the arrow A. For example, the oxygen-containing gas supply passages 90 allow the oxygen-containing gas to flow upwardly in the vertical direction. The oxygen-containing gas is supplied in the direction indicated by the arrow B along the oxygen-containing gas channel 54 of each fuel cell 30.

In the pair of separators 40 sandwiching the electrolyte electrode assembly 38, an insulating seal 92 for sealing the fuel gas supply passage 46 is provided between the adjacent fuel gas supply sections 48. For example, mica material, ceramic material or the like, i.e., crustal component material, glass material, or composite material of clay and plastic may be used for the insulating seal 92.

An exhaust gas discharge passage 94 is formed in the fuel cell 30 outside the sandwiching section 52 in the direction indicated by the arrow B. The fuel gas and oxygen-containing gas after partially consumed in the reaction in the electrolyte electrode assembly 38 are discharged as an exhaust gas through the exhaust gas discharge passage 94 in the stacking direction.

Figure 6:
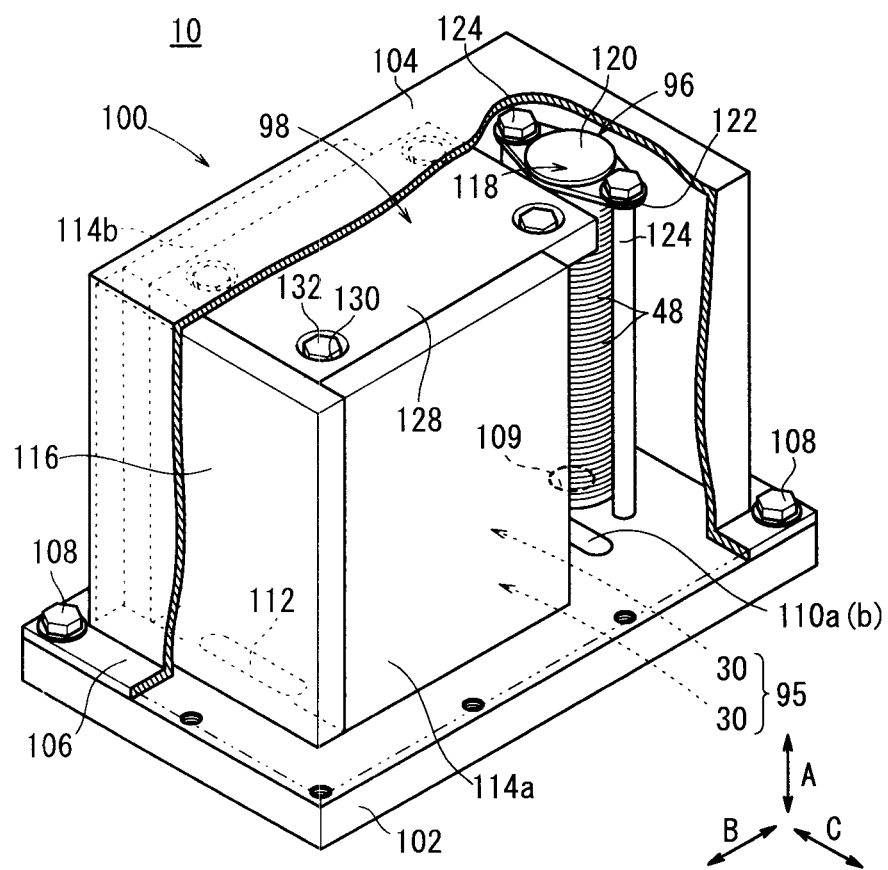
FIG. 6 is a perspective view, partially cut away, showing a state where the fuel cell is placed in a casing.

As shown in FIG. 6, the fuel cell stack 10 includes a stack body 95 formed by stacking a plurality of fuel cells 30 in the vertical direction. The stack body 95 is placed in a casing 100 through a first tightening load applying mechanism 96 and a second tightening load applying mechanism 98.

Figure 7:
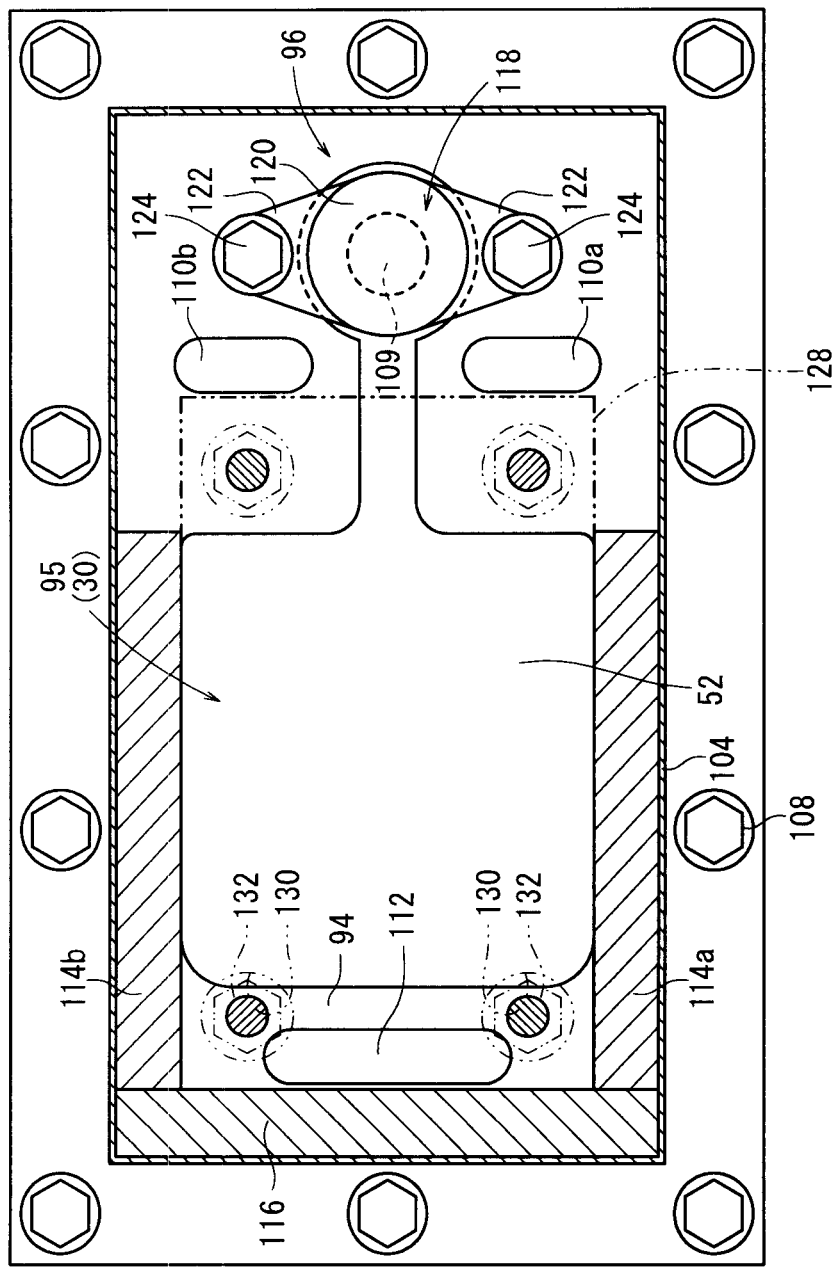
FIG. 7 is a plan view showing the casing containing the fuel cell.

The casing 100 includes a base 102 having a flat plate shape. A casing member 104 is mounted on the base 102. The casing member 104 is fixed to the base 102 by tightening a plurality of bolts 108 on a flange 106 of the casing member 104 and the outer edge of the base 102. As shown in FIGS. 6 and 7, the base 102 has one fuel gas hole 109 connected to the fuel gas supply passage 46 of the fuel cell 30, two air holes 110a, 110b connected to the oxygen-containing gas supply passages 90, and one exhaust gas hole 112 connected to the exhaust gas discharge passage 94.

In the casing member 104, side heat insulating members 114a, 114b are provided in parallel with extension lines of the bridges 50, on both sides of the stack body 95 (fuel cells 30). Further, a front heat insulating member 116 is provided at the front end of the fuel cells 30. Each of the side heat insulating members 114a, 114b and the front heat insulating member 116 is a rectangular flat plate, and made of heat insulating material such as mica. The side heat insulating members 114a, 114b and the front heat insulating member 116 tightly contact the inner walls of the casing member 104.

Figure 8:
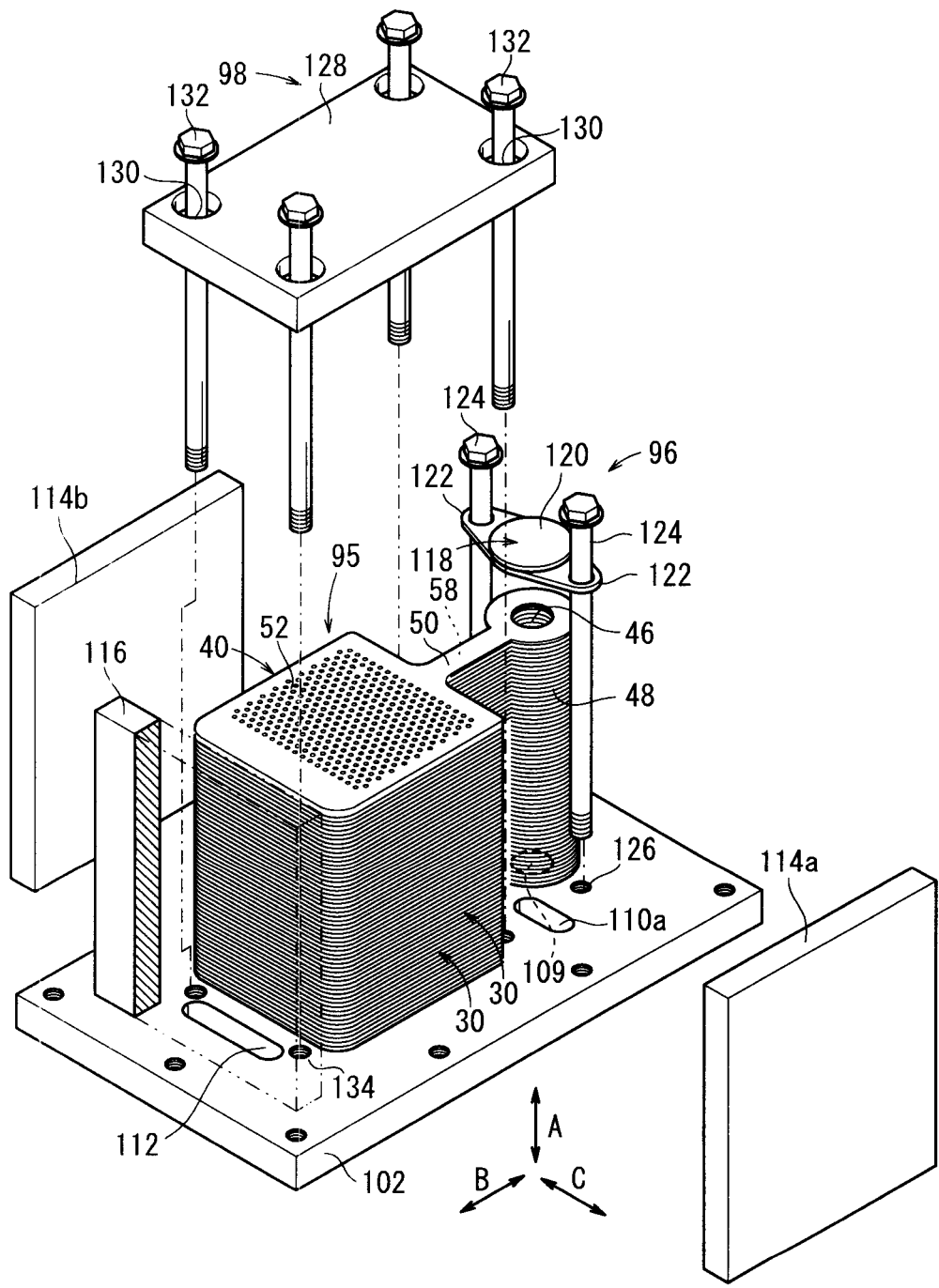
FIG. 8 is an exploded perspective view showing the inside of the casing.

As shown in FIGS. 6 to 8, the first tightening load applying mechanism 96 includes a pressure member 118 provided on the fuel gas supply sections 48, for maintaining the desired sealing performance in the fuel gas supply passage 46 to prevent leakage of the fuel gas. The pressure member 118 includes a circular disk section 120 covering the fuel gas supply passage 46 and extension plate sections 122 protruding from both sides of the circular disk section 120. Bolts 124 are inserted into each of the extension plate sections 122, and the bolts 124 are fitted into screw holes 126 formed in the base 102.

The second tightening load applying mechanism 98 includes an upper end heat insulating member 128 provided at the position where the sandwiching sections 52 and the electrolyte electrode assemblies 38 are stacked together. Stepped holes 130 are formed adjacent four corners of the upper end heat insulating member 128. Bolts 132 are inserted into the stepped holes 130, and fitted into screw holes 134 formed in the base 102. The upper end heat insulating member 128 is freely movable in the direction indicated by the arrow A in a space defined by the side heat insulating members 114a, 114b and the front heat insulating member 116.

At normal temperature, a predetermined clearance is formed between inner surfaces of the side heat insulating members 114a, 114b and both side surfaces of the sandwiching sections 52 of the fuel cells 30. At high temperature during operation of the fuel cells 30, the inner surfaces of the side heat insulating members 114a, 114b contact both side surfaces of the sandwiching sections 52 of the fuel cells 30. A space as the exhaust gas discharge passage 94 is formed between the front heat insulating member 116 and the front end of the sandwiching sections 52 of the fuel cells 30. The exhaust gas discharge passage 94 is connected to the exhaust gas hole 112.

Operation of the fuel cell system 12 will be described below.

As shown in FIG. 1, by operation of the raw fuel supply apparatus 16, for example, a raw fuel such as the city gas (including $CH_4$, $C_2H_6$, $C_3H_8$, $C_4H_{10}$) is supplied to the evaporator 26, and by operation of the water supply apparatus 20, water is supplied to the evaporator 26. Further, the oxygen-containing gas such as the air is supplied to the heat exchanger 24 through the oxygen-containing gas supply apparatus 18.

In the evaporator 26, the raw fuel is mixed with the water vapor, and a mixed fuel is obtained. The mixed fuel is supplied to the preliminary reformer 28. The mixed fuel undergoes steam reforming in the preliminary reformer 28. Thus, hydrocarbon of $C_{2+}$ is removed (reformed), and a reformed gas chiefly containing methane is obtained. The reformed gas is supplied to the fuel gas supply passage 46 of the fuel cell stack 10 from the fuel gas hole 109.

When the air supplied to the heat exchanger 24 moves through the heat exchanger 24, the air is heated to a predetermined temperature by heat exchange with the exhaust gas discharged from the exhaust gas discharge passage 94 into the exhaust gas hole 112 as described later. The air heated by the heat exchanger 24 is supplied to the oxygen-containing gas supply passages 90 of the fuel cell stack 10 through the air holes 110a, 110b.

As shown in FIGS. 2 and 3, the fuel gas supplied to the fuel gas supply passage 46 flows from the slits 76 into the annular groove 78 in the separator 40 of each fuel cell 30, and the fuel gas flows into the fuel gas supply channel 58 formed in the bridge 50. The fuel gas flows from the fuel gas supply channel 58 to the fuel gas channel 56 through the fuel gas inlet 80.

As shown in FIG. 4, the fuel gas inlet 80 is provided adjacent to the bridge 50, in the inner area S of the detour path forming wall 88. In the structure, after the fuel gas flows from the fuel gas inlet 80 into the fuel gas channel 56, by the guidance of the detour path forming wall 88, the fuel gas flowing through the fuel gas channel 56 is supplied to the anode 36 of the electrolyte electrode assembly 38 and then, the fuel gas is discharged through the through holes 86 and the fuel gas outlets 84 to the exhaust gas discharge passage 94.

The air supplied to the oxygen-containing gas supply passage 90 flows into the oxygen-containing gas channel 54 formed between the cathode 34 of each electrolyte electrode assembly 38 and the separator 40. The oxygen-containing gas moves through the oxygen-containing gas channel 54 in the direction indicated by the arrow B. Then, the oxygen-containing gas is supplied to the cathode 34 of the electrolyte electrode assembly 38, and discharged into the exhaust gas discharge passage 94.

Thus, in the electrolyte electrode assembly 38, the fuel gas is supplied to the anode 36, and the air is supplied to the cathode 34. At this time, oxygen ions flow through the electrolyte 32 toward the anode 36 for generating electricity by the electrochemical reactions.

The exhaust gas (fuel gas and air after partially consumed) discharged to the exhaust gas discharge passage 94 moves inside the casing 100 in the stacking direction of the fuel cells 30, and then, the exhaust gas is supplied to the heat exchanger 24 from the exhaust gas hole 112. Thus, in the heat exchanger 24, the waste heat is collected suitably, and the temperature of the air before consumption is raised suitably.

In the first embodiment, the tightening load in the stacking direction is not transmitted between the fuel gas supply section 48 and the sandwiching sections 52 sandwiching the electrolyte electrode assembly 38 through the elongated bridges 50. In the structure, the desired tightening load is applied to the electrolyte electrode assembly 38.

Thus, with simple and compact structure, a relatively large load is applied to the fuel gas supply section 48 requiring high sealing performance through the first tightening load applying mechanism 96, and a relatively small load enough to allow the electrolyte electrode assembly 38 to tightly contact the sandwiching sections 52 is applied to the electrolyte electrode assembly 38 through the second tightening load applying mechanism 98. In the structure, the desired sealing performance is obtained in the fuel gas supply section 48, and damages of the electrolyte electrode assembly 38 are prevented as much as possible. Moreover, power generation and current collection are performed efficiently.

Further, as shown in FIG. 4, after the fuel gas is supplied from the fuel gas inlet 80 to the fuel gas channel 56, blowing of the fuel gas to the outside is prevented through the outer edge 85 in the sandwiching section 52. Thus, the fuel gas is utilized effectively in the power generation reaction, and improvement in the fuel utilization ratio is achieved advantageously.

Further, gases other than the fuel gas, such as the oxygen-containing gas and the exhaust gas do not flow around to the anode 36 from the outside of the electrolyte electrode assembly 38. Therefore, degradation in the power generation efficiency due to oxidation of the anode 36 is prevented, and improvement in the durability of the separator 40 and the electrolyte electrode assembly 38 is achieved easily.

Further, since the detour path forming wall 88 contacts the anode 36, current collection can be performed desirably. Further, since the fuel gas flows around in the fuel gas channel 56, the length of the time for which the fuel gas flows along the electrode surface of the anode 36 is increased. Therefore, the fuel gas is utilized in the power generation reaction efficiently, and improvement in the fuel utilization ratio is achieved advantageously.

Further, the detour path forming wall 88 is provided between the fuel gas inlet 80 and the fuel gas outlets 84, and bent toward the fuel gas inlet 80 in a V shape. In the structure, the number of fuel gas inlets 80 that need to be produced with high precision is reduced significantly and economically. As in the case of providing a plurality of the fuel gas inlets 80, the fuel gas can be supplied along the electrode surface uniformly.

Further, the fuel gas inlet 80 is provided in the inner area S of the V-shaped detour path forming wall 88. Thus, since the fuel gas flows around in the fuel gas channel 56, the length of the time for which the fuel gas flows along the electrode surface of the anode 36 is increased. Therefore, the fuel gas is utilized in the power generation reaction efficiently, and improvement in the fuel utilization ratio is achieved advantageously.

Further, the extension lines P1, P2 of the both ends 88a, 88b of the detour path forming wall 88 are oriented toward the corners 52P1, 52P2 of the sandwiching section 52. In the structure, the fuel gas flows over the entire area in the fuel gas channel 56. That is, the fuel gas flows along the entire electrode surface of the anode 36 over a long period of time, and the fuel gas can be utilized effectively in the power generation reaction. Accordingly, the fuel gas utilization ratio is improved suitably. Further, simply by using the single fuel gas inlet 80, the fuel gas is supplied to the entire electrode surface uniformly.

Further, the fuel gas outlets 84 are provided along one side of the sandwiching section 52 intersecting the extension line of the bridge 50. In the structure, the fuel gas after partially consumed is discharged in the direction of the extension line of the bridge 50, and the waste heat is collected easily.

Further, the fuel cell 30 is a solid oxide fuel cell, and suitably used as a high temperature fuel cell. In particularly, it becomes possible to avoid problems of heat stress suitably, and size reduction of the fuel cell 30 is achieved easily.

Figure 9:
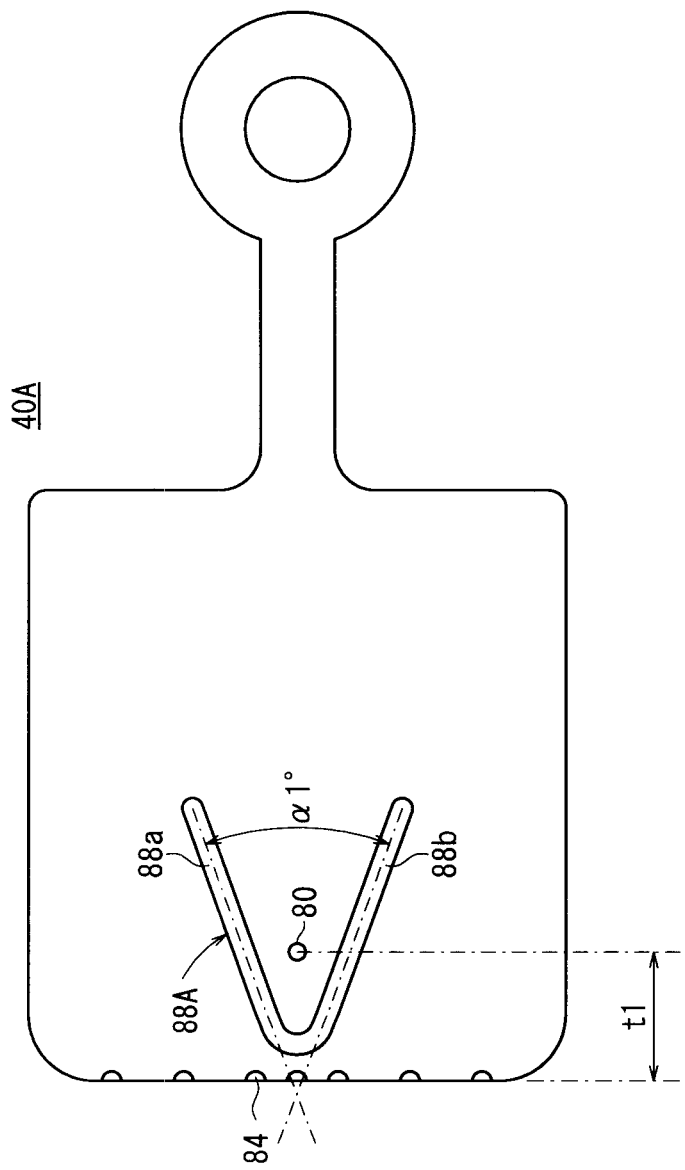
FIG. 9 is a view showing a relationship between a position of a fuel gas inlet and a bending angle of a detour path forming wall.

Further, the bending angle of the V-shaped detour path forming wall 88 can be changed depending on the distance between the fuel gas inlet 80 and the fuel gas outlets 84. For example, in a separator 40A shown in FIG. 9 where the fuel gas inlet 80 is provided adjacent to the fuel gas outlets 84, and the fuel gas inlet 80 is spaced from the fuel gas outlets 84 by the distance t1, the bending angle α1° between the V-shaped wall surfaces of a detour path forming wall 88A is small.

Figure 10:
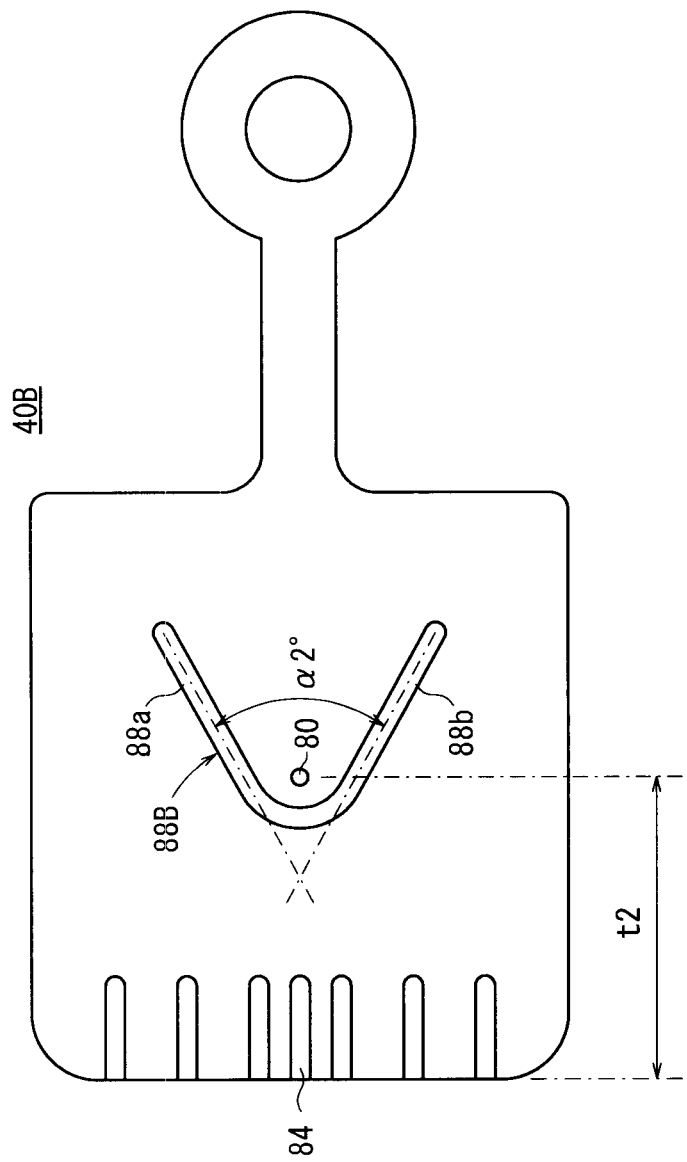
FIG. 10 is a view showing a relationship between a position of the fuel gas inlet and a bending angle of the detour path forming wall.

In a separator 40B shown in FIG. 10 where the distance t2 between the fuel gas inlet 80 and the fuel gas outlets 84 is substantially an intermediate distance (t2>t1), the bending angle α2° between wall surfaces of a V-shaped detour path forming wall 88B is relatively large (α2°>α1°).

Figure 11:
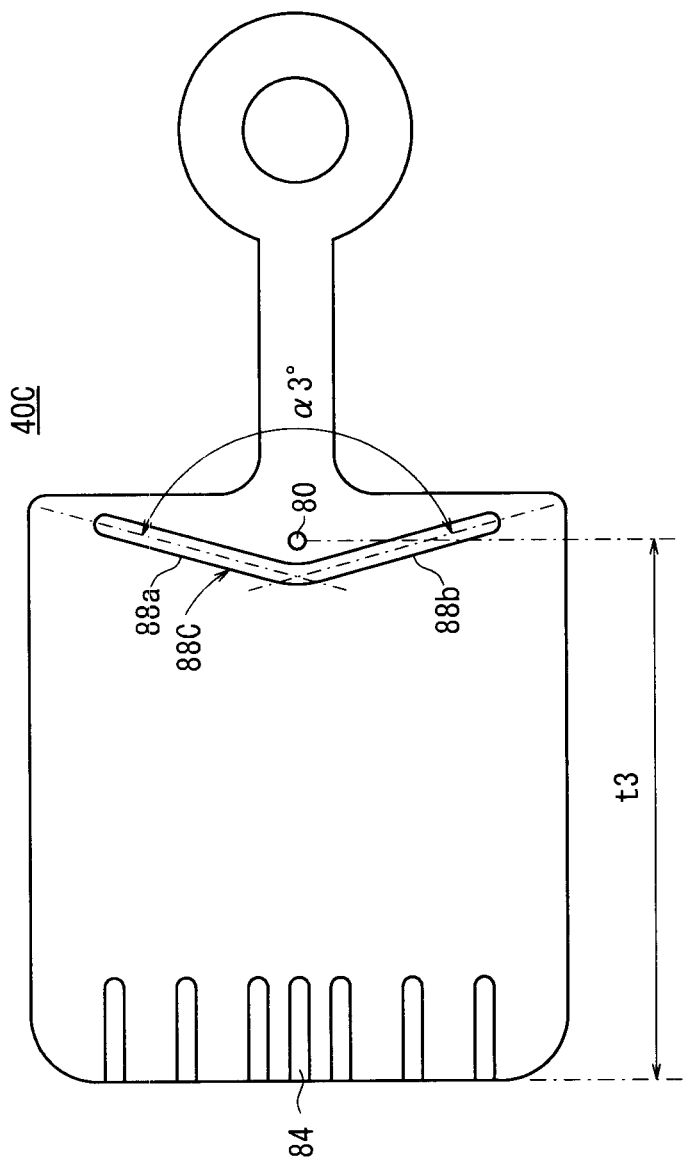
FIG. 11 is a view showing a relationship between a position of the fuel gas inlet and a bending angle of the detour path forming wall.

Further, in a separator 40C shown in FIG. 11 where the distance t3 between the fuel gas inlet 80 and the fuel gas outlets 84 is large (t3>t2), the bending angle α3° between wall surfaces of a V-shaped detour path forming wall 88C is considerably large (α3°>α2°).

Therefore, even if the position of the fuel gas inlet 80 is changed, it is sufficient to only change the bending angle α1° of the detour path forming wall 88A, the bending angle α2° of the detour path forming wall 88B, or the bending angle α3° of the detour path forming wall 88C. Thus, with simple and economical structure, it becomes possible to supply the fuel gas uniformly and suitably.

Figure 12:
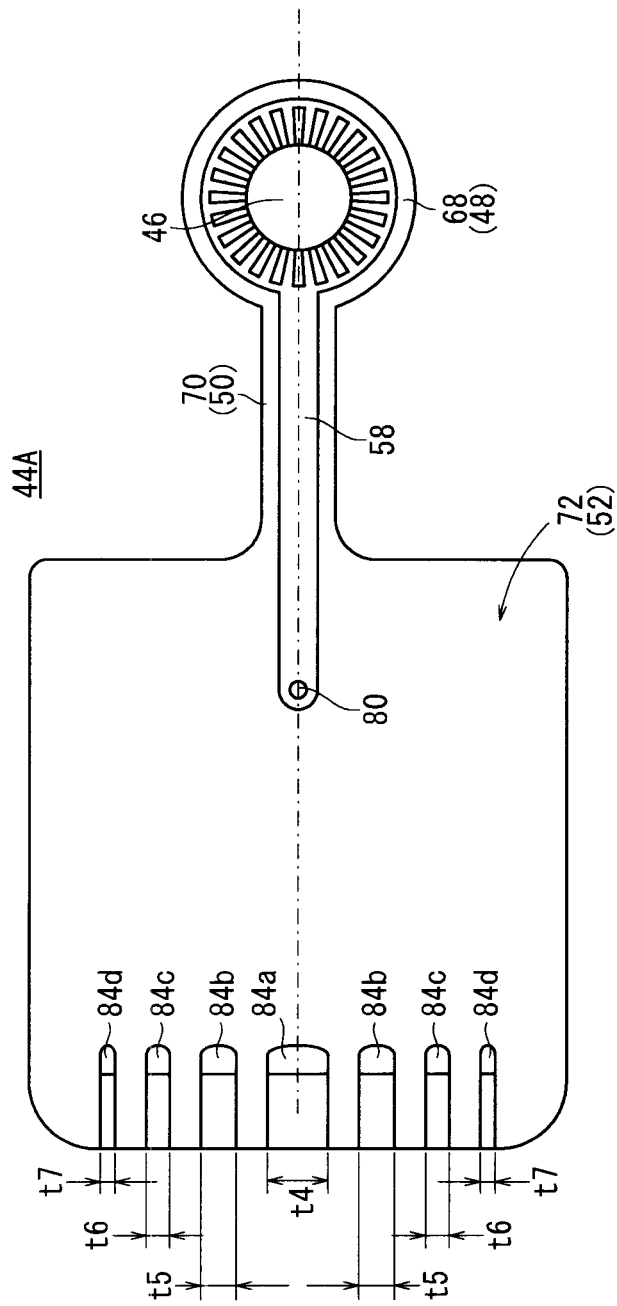
FIG. 12 is a view showing fuel gas outlets having different surface areas.

Further, a plurality of the fuel gas outlets 84 are formed on one side of the sandwiching section 52 intersecting the extension line of the bridge 50. For example, in a second plate 44A shown in FIG. 12, the fuel gas outlet 84a is provided at a position intersecting the extension line of a second elongated plate section 70 (bridge 50). The fuel gas outlets 84b, 84c, 84d are arranged in both directions away from the intersecting position.

In this arrangement, the widths of the openings of the fuel gas outlets 84a to 84d are decreased successively in directions away from the intersecting position (t4>t5>t6>t7), and thus the cross sectional areas of the openings are decreased in a direction away from the intersecting position.

The cross sectional area of the opening of the fuel gas outlet 84a on the central side where the fuel gas does not flow smoothly is larger than the cross sectional area of the openings of the fuel gas outlets 84d on both ends where the fuel gas flows smoothly. Thus, with simple and economical structure, it becomes possible to supply the fuel gas uniformly and suitably.

Figure 13:
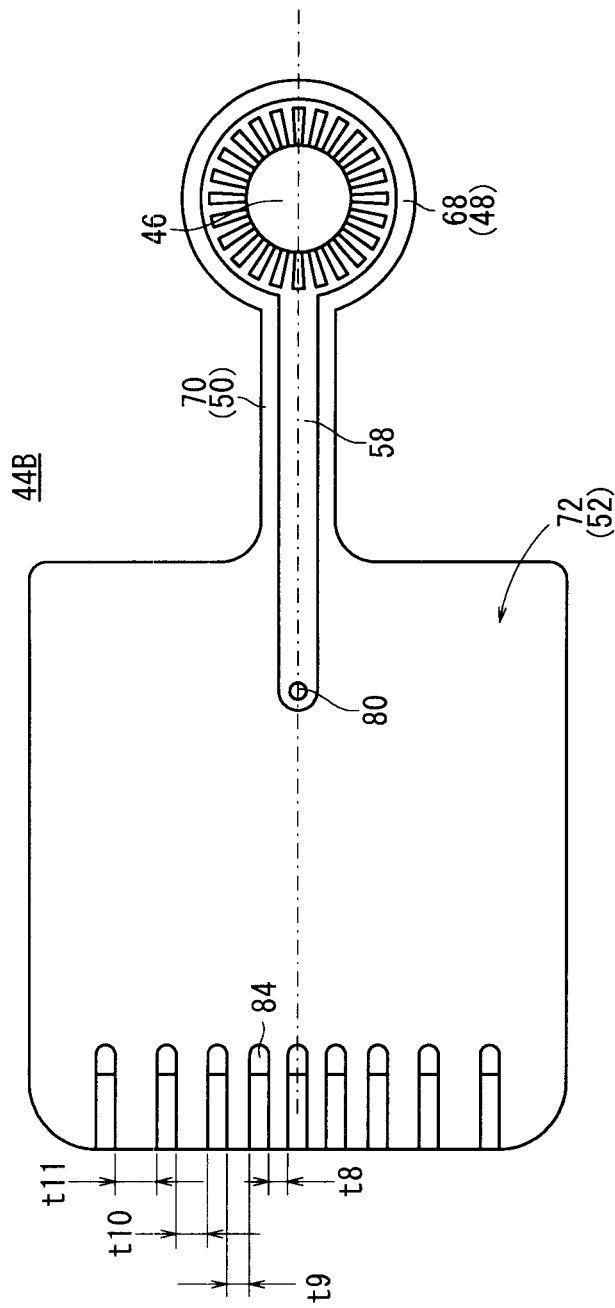
FIG. 13 is a view showing fuel gas outlets arranged at different intervals.

Further, in a second plate 44B shown in FIG. 13, a plurality of the fuel gas outlets 84 are arranged in a direction intersecting the extension line of the second elongated plate section 70 (bridge 50). The intervals t8, t9, t10, t11 between the fuel gas outlets 84 are increased in directions away from the intersecting position. Thus, as in the case of the second plate 44A, with simple and economical structure, it becomes possible to supply the fuel gas uniformly and suitably.

Figure 14:
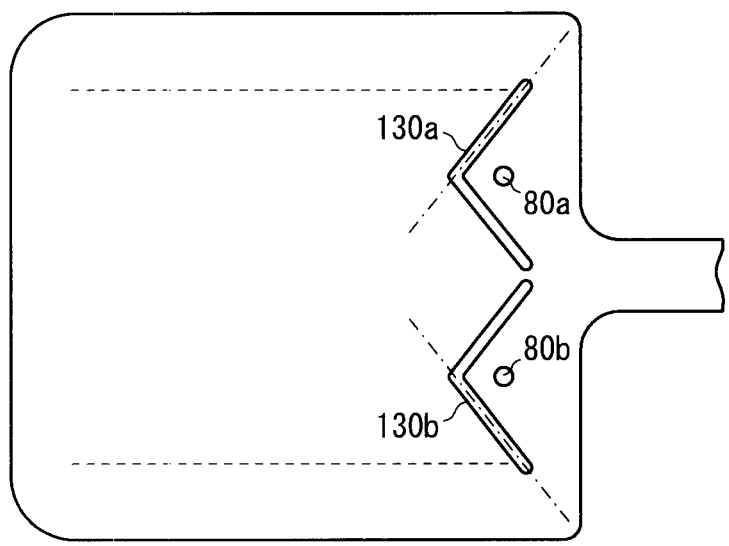
FIG. 14 is a view showing a relationship between the fuel gas inlets and the detour path forming walls.

Further, in the first embodiment, though one detour path forming wall 88 and one fuel gas inlet 80 are provided, the present invention is not limited in this respect. For example, as shown in FIG. 14, two fuel gas inlets 80a, 80b may be provided, and V-shaped detour path forming walls 130a, 130b may be provided around the fuel gas inlets 80a, 80b.

Figure 15:
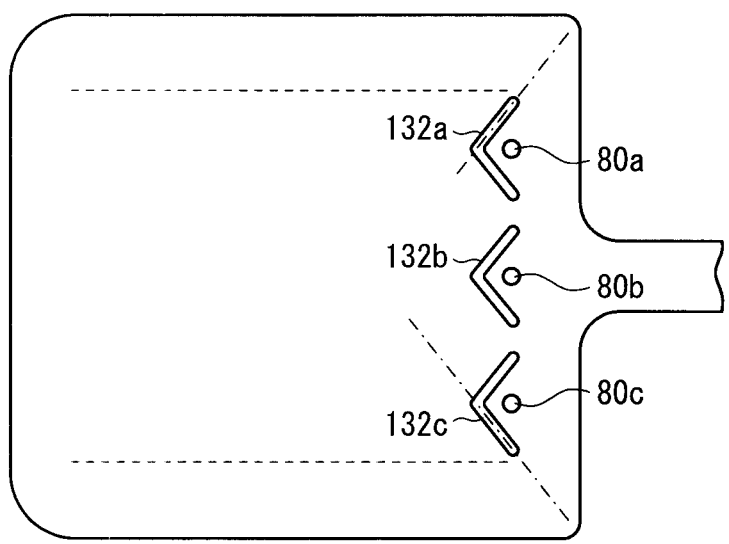
FIG. 15 is a view showing a relationship between the fuel gas inlets and the detour path forming walls.

Further, as shown in FIG. 15, three fuel gas inlets 80a, 80b, 80c may be provided, and three V-shaped detour path forming walls 132a, 132b, and 132c may be provided corresponding to the fuel gas inlets 80a, 80b, 80c.

Figure 16:
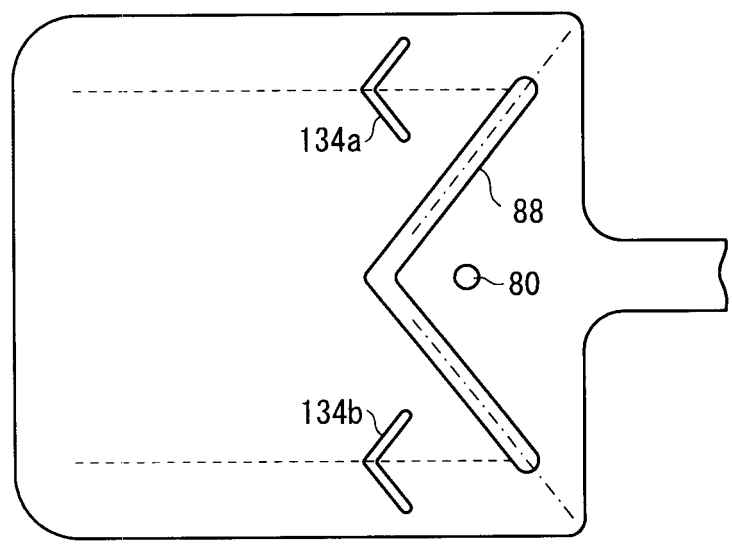
FIG. 16 is a view showing a relationship between the fuel gas inlet and the detour path forming walls.

Further, as shown in FIG. 16, a V-shaped detour path forming wall 88 may be provided to cover a single fuel gas inlet 80, and V-shaped detour path forming walls 134a, 134b may be provided adjacent to the detour path forming wall 88.

Figure 17:
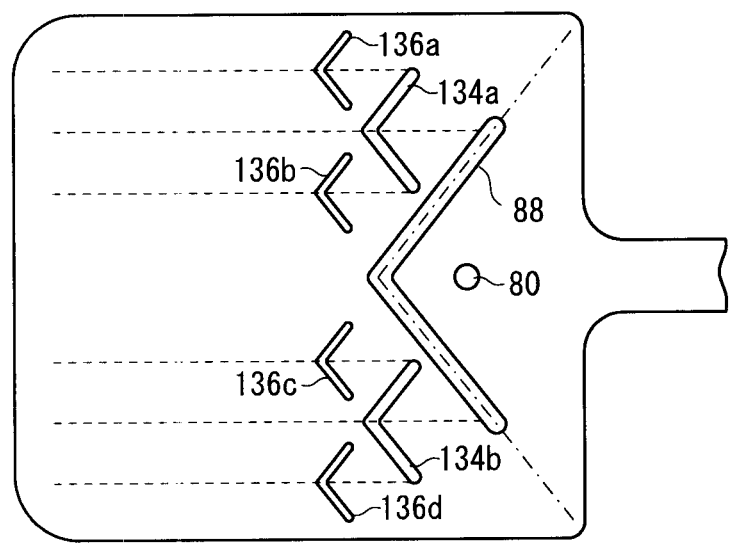
FIG. 17 is a view showing a relationship between the fuel gas inlet and the detour path forming walls.

Further, as shown in FIG. 17, a V-shaped detour path forming wall 88 may be provided around a single fuel gas inlet 80, and detour path forming walls 134a, 134b may be provided corresponding to sides of the detour path forming wall 88. Further, detour path forming walls 136a, 136b, 136c, and 136d may be formed corresponding to sides of the detour path forming walls 134a, 134b.

Figure 18:
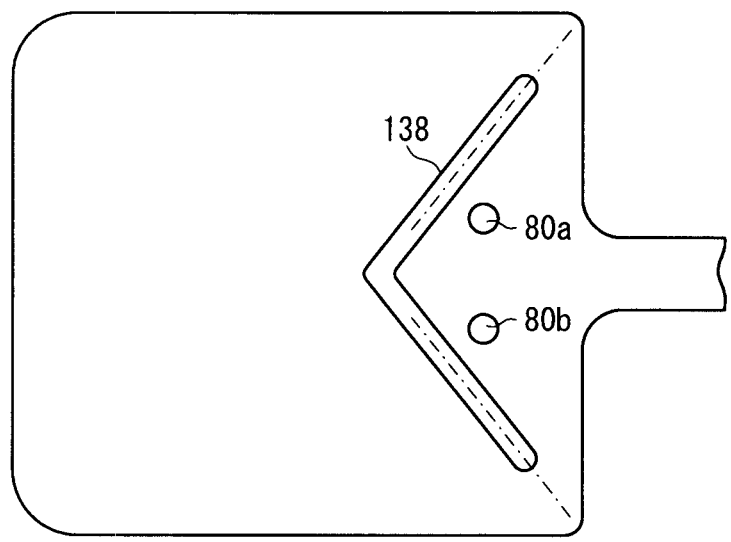
FIG. 18 is a view showing a relationship between the fuel gas inlets and the detour path forming wall.

Further, as shown in FIG. 18, a single V-shaped detour forming wall 138 may be provided such that two fuel gas inlets 80a, 80b are positioned in an inner area of the detour path forming wall 138.

Figure 19:
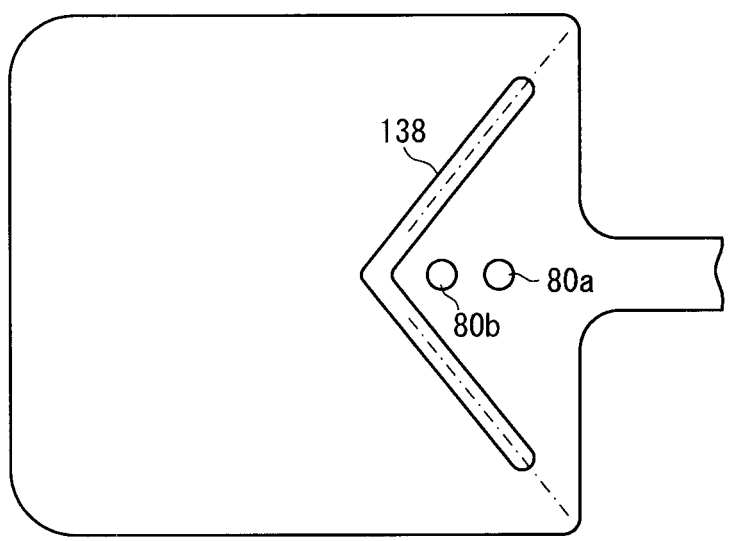
FIG. 19 is a view showing a relationship between the fuel gas inlets and the detour path forming wall.

Further, as shown in FIG. 19, two fuel gas inlets 80a, 80b may be arranged in an extension direction of the sandwiching section 52, and a single V-shaped detour path forming wall 138 having the fuel gas inlets 80a, 80b in the inner area may be provided.

Figure 20:
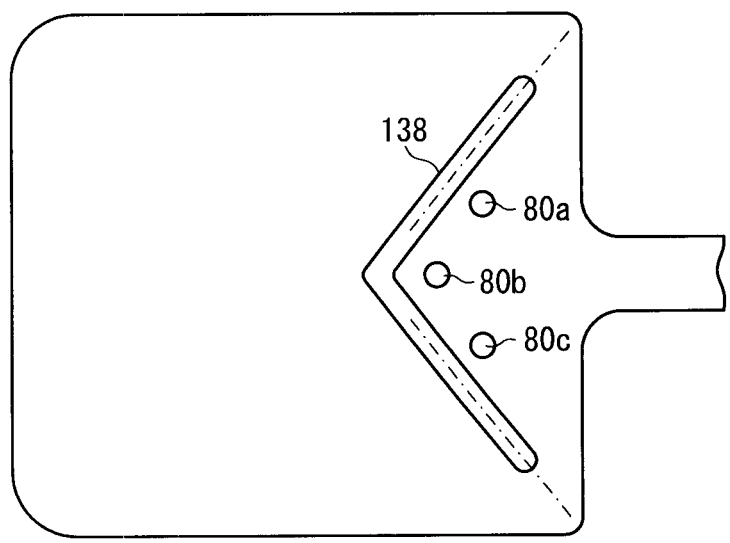
FIG. 20 is a view showing a relationship between the fuel gas inlets and the detour path forming wall.

Further, as shown in FIG. 20, three fuel gas inlets 80a, 80b, 80c may be provided in the inner area of a single detour path forming wall 138.

In FIGS. 14 to 20, the extension line from at least one end of the detour path forming wall is oriented to the corner of the sandwiching section. In the case where the detour path forming wall is provided in a lower stage, the detour path forming wall in the lower stage is placed to bridge a line drawn from each end of the detour path forming wall in the upper stage toward the flow direction.

Figure 21:
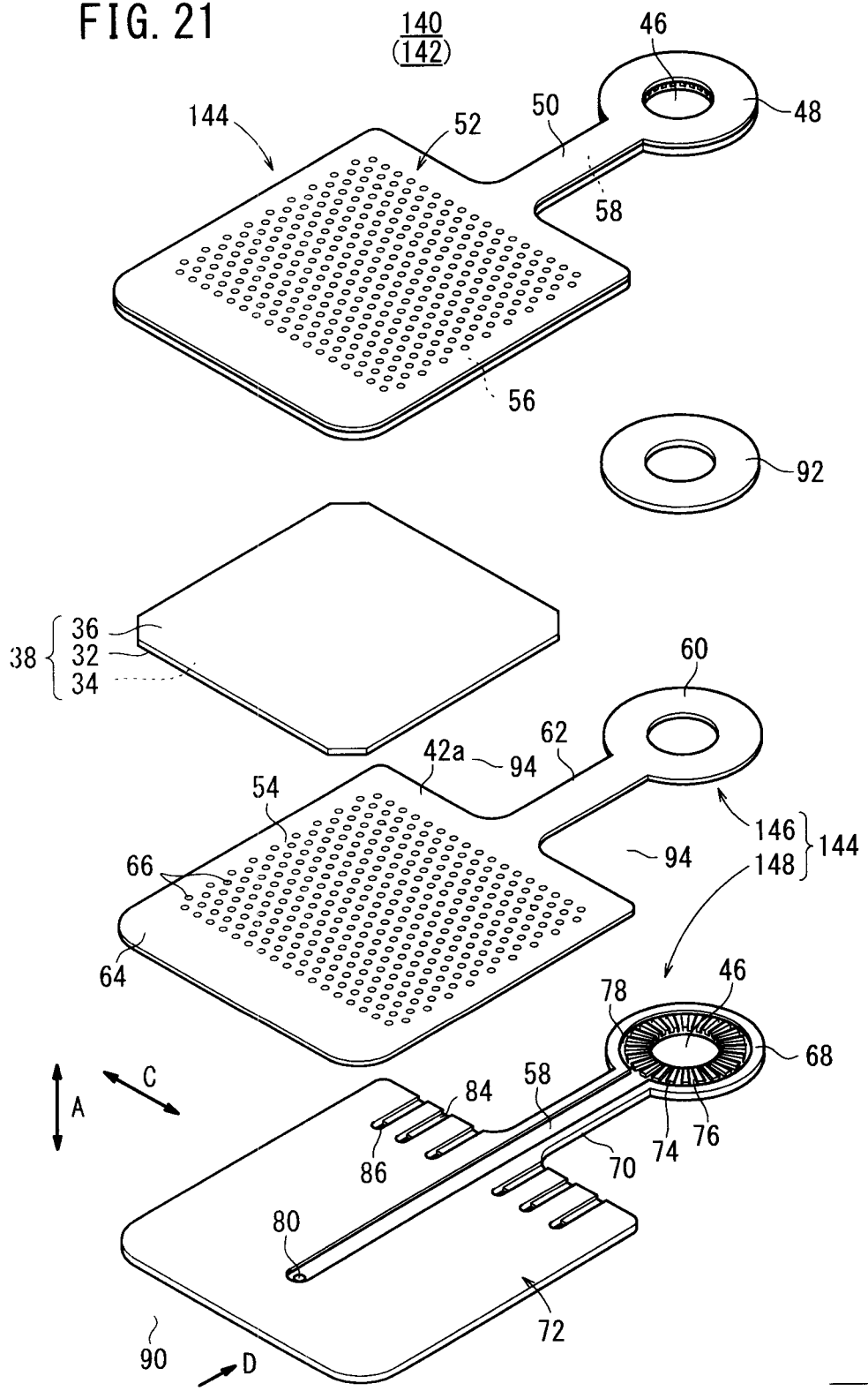
FIG. 21 is an exploded perspective view showing a fuel cell according to a second embodiment of the present invention.

FIG. 21 is an exploded perspective view showing a fuel cell 140 according to a second embodiment of the present invention. A plurality of the fuel cells 140 are stacked together to form a fuel cell stack 142.

The constituent elements that are identical to those of the fuel cell 30 according to the first embodiment are labeled with the same reference numerals, and description thereof will be omitted. Also in third and other embodiments as described later, the constituent elements that are identical to those of the fuel cell 30 according to the first embodiment are labeled with the same reference numerals, and description thereof will be omitted.

The fuel cell 140 includes a pair of separators 144 sandwiching an electrolyte electrode assembly 38. The separator 144 includes a first plate 146 and a second plate 148. The first plate 146 has the same structure as the above-mentioned first plate 42.

In the second plate 148, a fuel gas inlet 80 is formed at a front end of the second rectangular section 72, and a plurality of fuel gas outlets 84 are provided in the inner edge of the second rectangular section 72, i.e., along one side of the second rectangular section 72 to the second elongated plate section 70.

Figure 22:
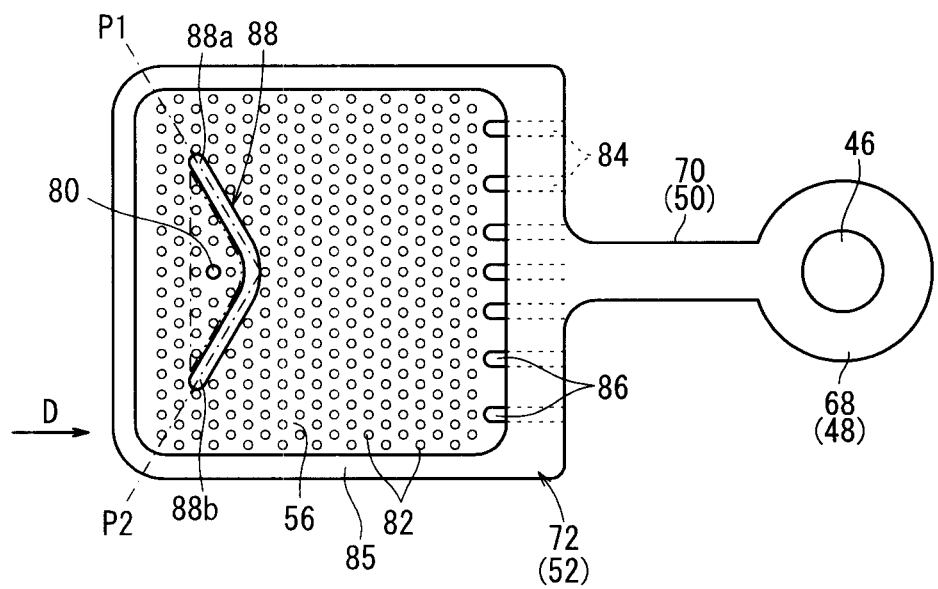
FIG. 22 is a view showing a second plate of the fuel cell.

As shown in FIG. 22, a V-shaped detour path forming wall 88 is positioned between the fuel gas inlet 80 and the fuel gas outlets 84, and bent in a V-shape toward the fuel gas inlet 80. The oxygen-containing gas supply passage 90 is formed on one side of the sandwiching section 52, and the oxygen-containing gas is supplied from the oxygen-containing gas supply passage 90 along the oxygen-containing gas channel 54 in the direction indicated by the arrow D. The exhaust gas discharge passages 94 are formed on both sides of the bridge 50 (see FIG. 21).

In the second embodiment, the oxygen-containing gas and the fuel gas flow in the direction indicated by the arrow D, opposite to the direction indicated by the arrow B in the case of the first embodiment. Thus, in the second embodiment, the same advantages as in the case of the first embodiment are obtained. Additionally, the temperature of the fuel gas flowing through the fuel gas supply passage 46 is raised effectively.

Figure 23:
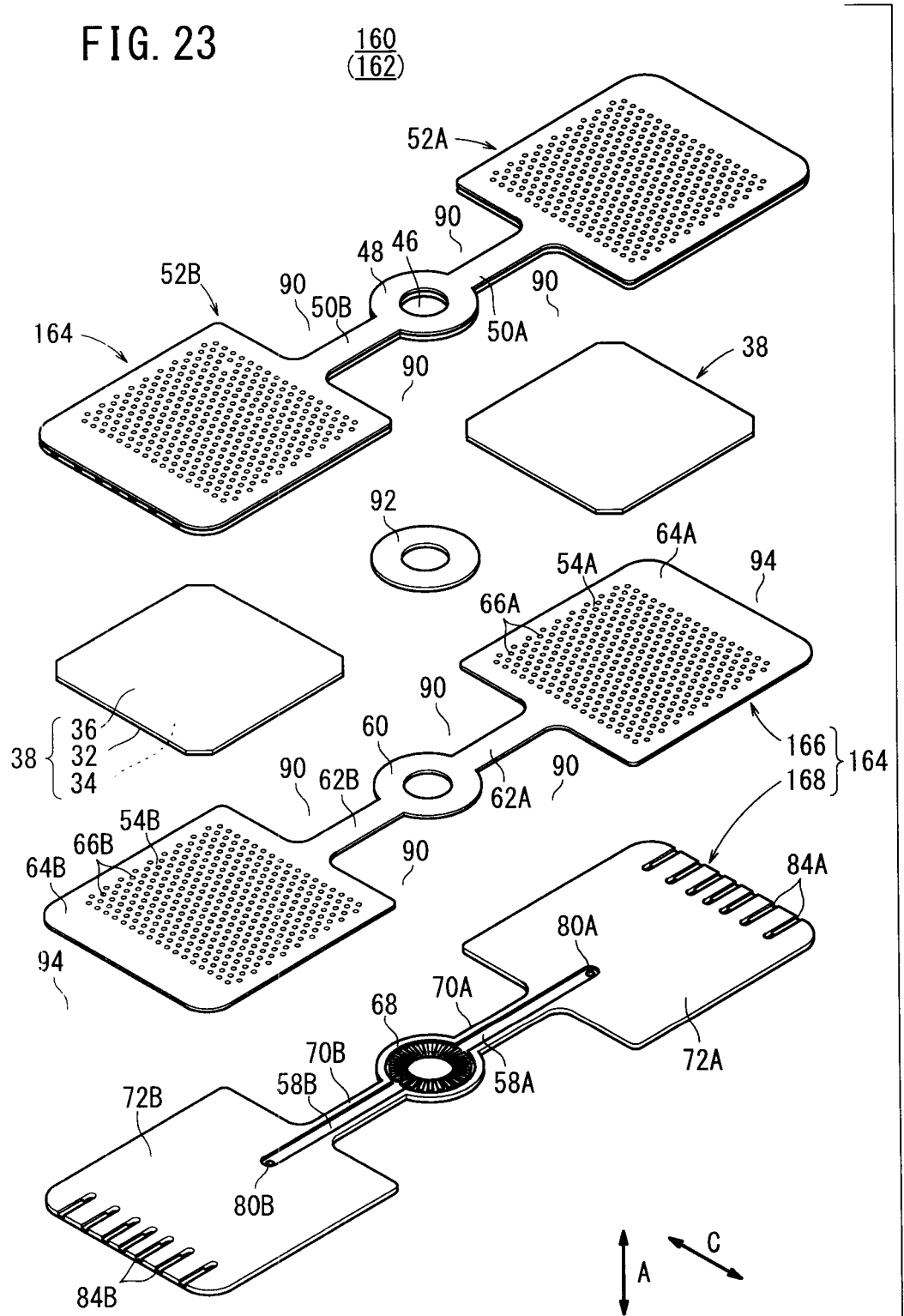
FIG. 23 is an exploded perspective view showing a fuel cell according to a third embodiment of the present invention.

FIG. 23 is an exploded perspective view showing a fuel cell 160 according to a third embodiment of the present invention. A plurality of fuel cells 160 are stacked together to form a fuel cell stack 162.

The fuel cell 160 includes a pair of separators 164 sandwiching two electrolyte electrode assemblies 38 in the same plane. The separator 164 includes a first plate 166 and a second plate 168. A fuel gas supply section 48 is provided at the center of the separator 164, and a fuel gas supply passage 46 extends through the fuel gas supply section 48. A pair of bridges 50A, 50B are connected to the fuel gas supply section 48. The bridges 50A, 50B extend from the fuel gas supply section 48 in opposite directions to each other. Sandwiching sections 52A, 52B are provided integrally with the bridges 50A, 50B, symmetrically with respect to the fuel gas supply section 48.

The first plate 166 includes a first circular disk section 60, and the fuel gas supply passage 46 extends through the first circular disk section 60. First elongated plate sections 62A, 62B are provided integrally with the first circular disk section 60, and the first elongated plate sections 62A, 62B extend from the first circular disk section 60 in opposite directions to each other. The first rectangular sections 64A, 64B are formed integrally with the first elongated plate sections 62A, 62B. Oxygen-containing gas channels 54A, 54B are formed by a plurality of projections 66A, 66B in the surfaces of the first rectangular sections 64A, 64B facing the cathodes 34.

The second plate 168 includes a second circular disk section 68, and the fuel gas supply passage 46 extends through the center of the second circular disk section 68. Second elongated plate sections 70A, 70B are provided integrally with the second circular disk section 68, and the second elongated plate sections 70A, 70B extend from the second circular disk section 68 in opposite directions to each other. Second rectangular sections 72A, 72B are formed integrally with the second elongated plate sections 70A, 70B.

Fuel gas supply channels 58A, 58B extend as paths extending from the second elongated plate sections 70A, 70B to positions in the middle of the second rectangular sections 72A, 72B. Fuel gas inlets 80A, 80B are formed at ends of the fuel gas supply channels 58A, 58B. A plurality of fuel gas outlets 84A, 84B are formed in the second rectangular sections 72A, 72B on the surfaces where the fuel gas supply channels 58A, 58B are formed.

Figure 24:
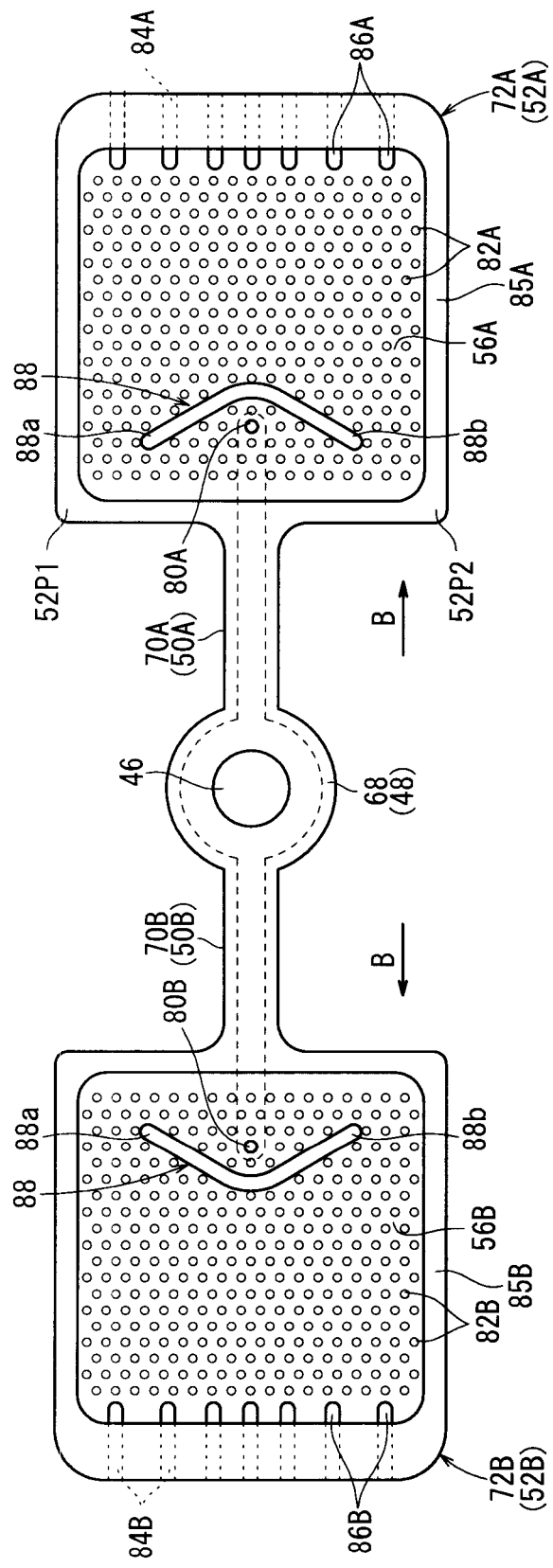
FIG. 24 is a view showing a second plate of the fuel cell.

As shown in FIG. 24, fuel gas channels 56A, 56B are formed by a plurality of projections 82A, 82B on surfaces of the second rectangular sections 72A, 72B which contact the anodes 36. Outer ridges 85A, 85B are formed around the fuel gas channels 56A, 56B. The fuel gas channels 56A, 56B have through holes 86A, 86B connected to the fuel gas outlets 84A, 84B. A V-shaped detour path forming wall 88 is formed between the fuel gas inlets 80A, 80B and the fuel gas outlets 84A, 84B.

Figure 25:
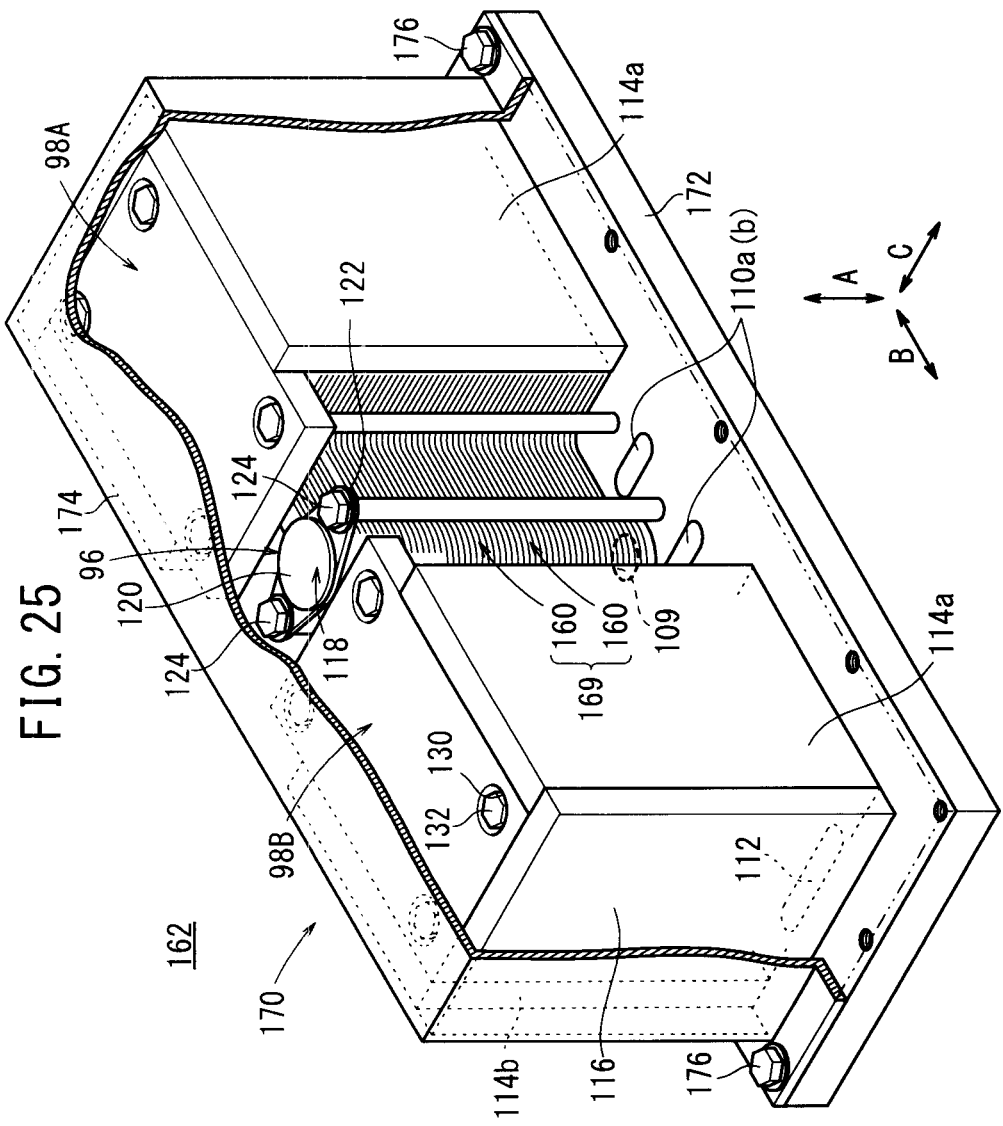
FIG. 25 is a perspective view, partially cut away, showing a state where the fuel cell is placed in a casing.

As shown in FIG. 25, the fuel cell stack 162 includes a casing 170 containing a stack body 169 formed by stacking a plurality of the fuel cells 160. The casing 170 includes a base 172 and a casing member 174. The base 172 and the casing member 174 are fixed using a plurality of bolts 176. A plurality of the fuel cells 160 are placed in the casing member 174, and predetermined loads are applied to the fuel cells 160 by a first tightening load applying mechanism 96 and a pair of left and right second tightening load applying mechanisms 98A, 98B.

Figure 26:
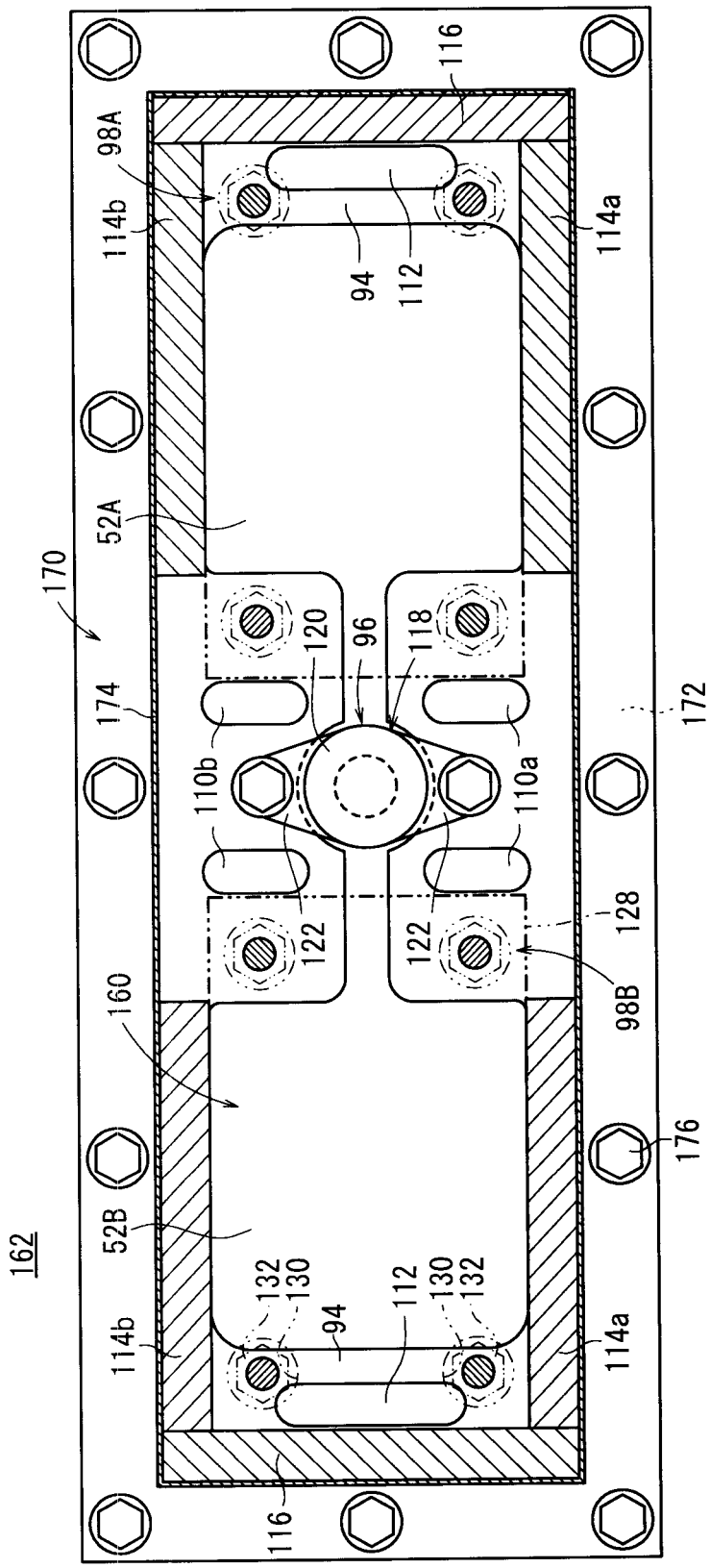
FIG. 26 is a plan view showing the casing containing the fuel cell.

As shown in FIG. 26, in the casing member 174, side heat insulating members 114a, 114b and a front heat insulating member 116 are provided for each of the sandwiching sections 52A, 52B.

In the third embodiment, the same advantages as in the case of the first embodiment are obtained. Additionally, since the two electrolyte electrode assemblies 38 are sandwiched between the pair of separators 164 in the same plane, improvement in the output of the fuel cells 160 is achieved effectively.

Figure 27:
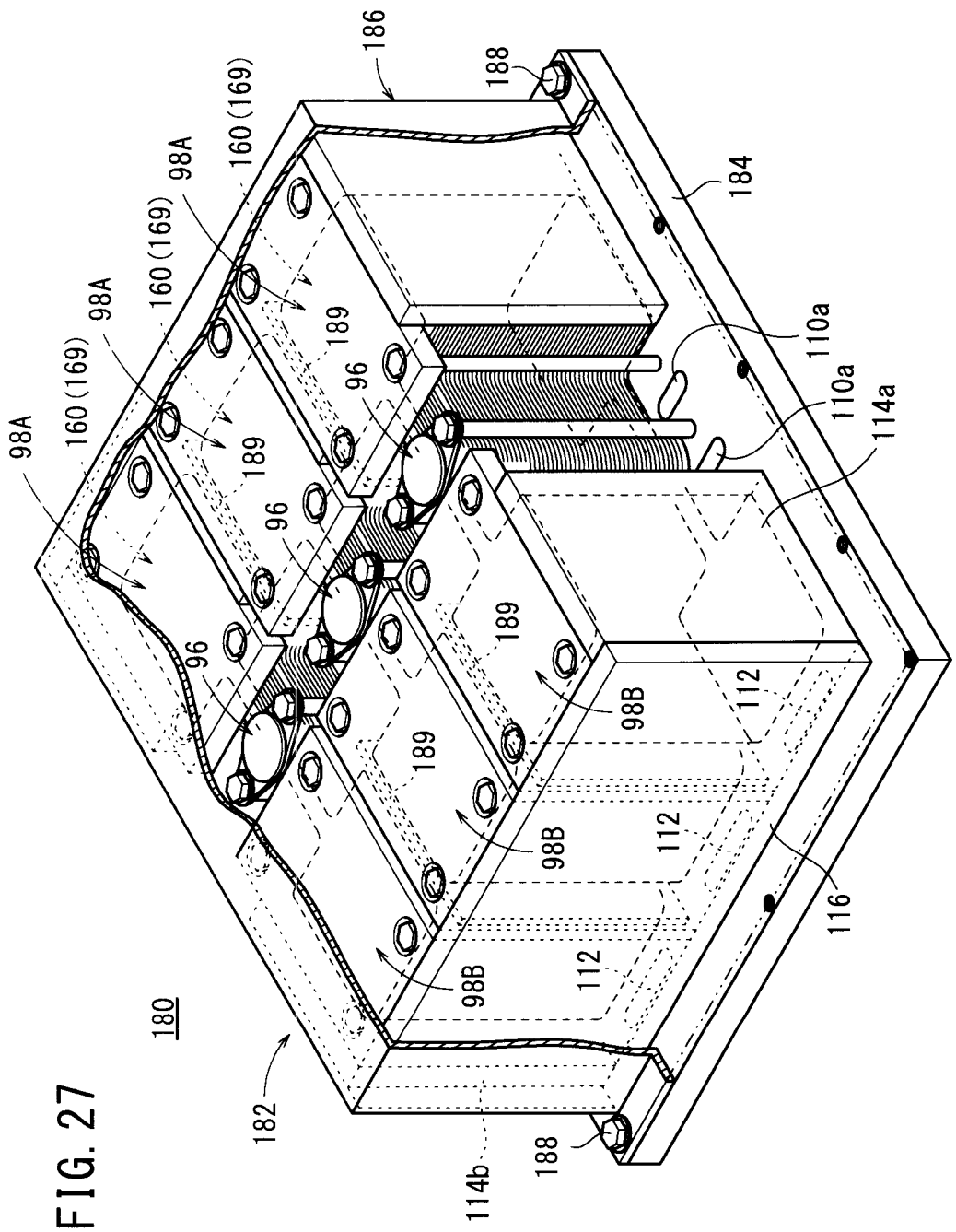
FIG. 27 is a perspective view, partially cut away, showing a fuel cell stack according to a fourth embodiment of the present invention.

FIG. 27 is a perspective view schematically showing a fuel cell stack 180 according to a fourth embodiment of the present invention.

The fuel cell stack 180 includes a casing 182 containing stack bodies 169 arranged in parallel. Each of the stack bodies 169 is formed by stacking a plurality of fuel cells 160. A casing member 186 of the casing 182 is fixed to a base 184 using bolts 188. In the stack bodies 169 each formed by stacking a predetermined number of the fuel cells 160, the fuel gas supply sections 48 are tightened by first tightening load applying mechanisms 96. Sandwiching sections 52A, 52B are tightened by second tightening load applying mechanisms 98A, 98B.

For instance, the stack bodies 169 are arranged in three rows, and an insulating sheet 189 made of insulating material such as ceramics, mica, glass is interposed in each space between the stack bodies of the fuel cells 160 for preventing electrical connection of the adjacent fuel cells 160.

In the fourth embodiment having the above structure, the fuel cells 160 have the rectangular sandwiching sections 52A, 52B, and the sandwiching sections 52A, 52B are provided symmetrically with respect to the fuel gas supply section 48.

Thus, the stack bodies 169 each formed by stacking the fuel cells 160 can be placed in parallel and closed to each other, and the space for providing the fuel cells 160 can be reduced as much as possible.

Figure 28:
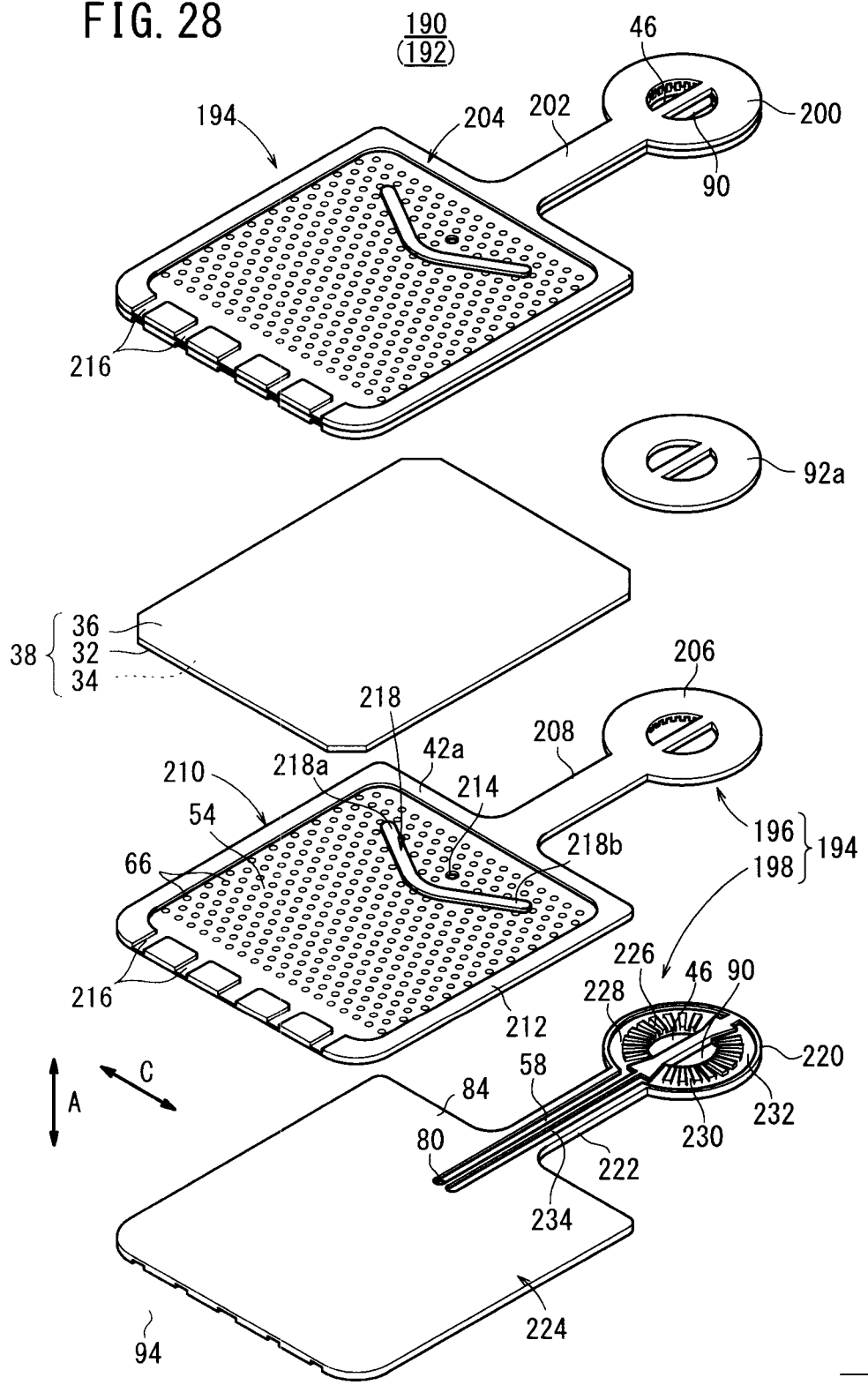
FIG. 28 is an exploded perspective view showing a fuel cell according to a fifth embodiment of the present invention.

FIG. 28 is an exploded perspective view showing main components of a fuel cell 190 according to a fifth embodiment of the present invention.

Figure 29:
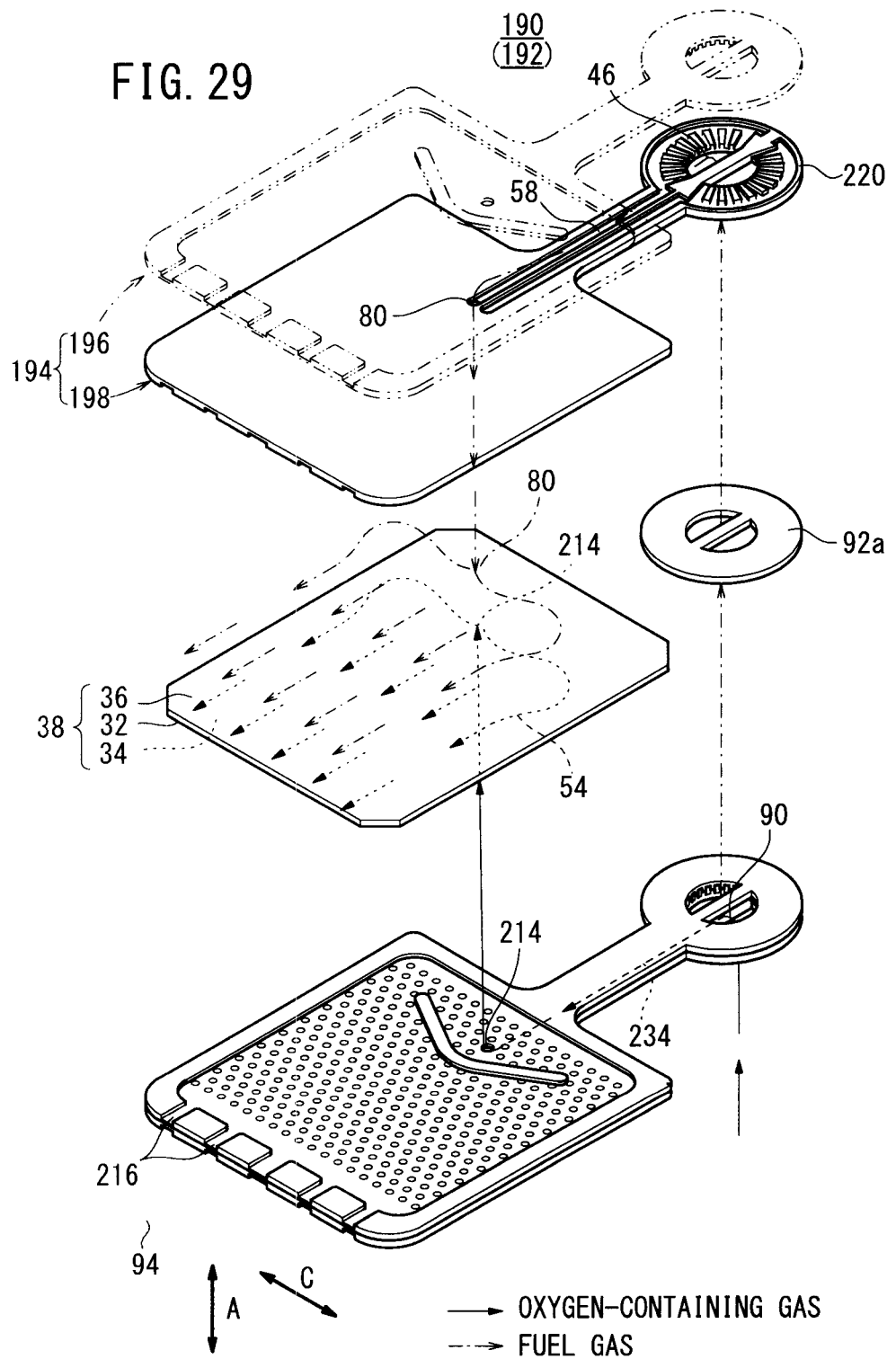
FIG. 29 is a partial exploded perspective view showing gas flows in the fuel cell.

As shown in FIGS. 28 and 29, a plurality of fuel cells 190 are stacked together to form a fuel cell stack 192. The fuel cell 190 includes a single electrolyte electrode assembly 38 and a pair of separators 194 sandwiching the electrolyte electrode assembly 38. Each of the separators 194 includes a first plate 196 and a second plate 198 which are joined to each other.

The separator 194 has a reactant gas supply section 200, and a fuel gas supply passage 46 and an oxygen-containing gas supply passage 90 extend through the reactant gas supply section 200. A rectangular sandwiching section 204 is provided integrally with the reactant gas supply section 200 through a narrow bridge 202.

The first plate 196 includes a first circular disk section 206, a first elongated plate section 208 of the bridge 202, and a first rectangular section 210 of the sandwiching section 204. The fuel gas supply passage 46 and the oxygen-containing gas supply passage 90 each having a semicircular shape extend through the first circular disk section 206. An oxygen-containing gas channel 54 is formed by a plurality of projections 66 on a surface of the first rectangular section 210 which contacts the cathode 34 of the electrolyte electrode assembly 38. The outer ridge 212 is formed around the oxygen-containing gas channel 54, and contacts the outer edge of the cathode 34.

An oxygen-containing gas inlet 214 is formed in the oxygen-containing gas channel 54 of the first rectangular section 210 at a position adjacent to the first elongated plate section 208. In a front end of the first rectangular section 210, a plurality of oxygen-containing gas outlets 216 for discharging the oxygen-containing gas after partially consumed through the oxygen-containing gas channel 54 are arranged in a direction perpendicular to the extension line of the first elongated plate section 208. The cross sectional areas in the openings of the oxygen-containing gas outlets 216 become small in directions away from the position intersecting the extension line of the first elongated plate section 208. Alternatively, the intervals between the oxygen-containing gas outlets 216 may be increased in directions away from the position intersecting the extension line of the first elongated plate section 208.

A detour path forming wall 218 is provided between the oxygen-containing gas inlet 214 and the oxygen-containing gas outlets 216. The detour path forming wall 218 is bent in a V-shape toward the oxygen-containing gas inlet 214 for preventing the oxygen-containing gas from flowing straight from the oxygen-containing gas inlet 214 to the oxygen-containing gas outlets 216. The oxygen-containing gas inlet 214 is provided in the inner area of the V-shaped detour path forming wall 218. The extension lines of both ends 218*a*, 218*b* are oriented toward corners of the first rectangular section 210.

The second plate 198 includes a second circular disk section 220, a narrow second elongated plate section 222, and a second rectangular section 224. The fuel gas supply passage 46 and the oxygen-containing gas supply passage 90 each having a semicircular opening in cross section extend through the second circular disk section 220. The second circular disk section 220 include slits 226 and an annular groove 228 connected to the fuel gas supply passage 46, and slits 230 and an annular groove 232 connected to the oxygen-containing gas supply passage 90, on its surface facing the first plate 196.

In the second elongated plate section 222, a fuel gas supply channel 58 and an oxygen-containing gas supply channel 234 are formed in parallel to each other. One end of the fuel gas supply channel 58 is connected to the annular groove 228, and the other end of the fuel gas supply channel 58 extends into the second rectangular section 224. One end of the oxygen-containing gas supply channel 234 is connected to the annular groove 232, and the other end of the oxygen-containing gas supply channel 234 extends into the second rectangular section 224. The fuel gas inlet 80 is formed at the end of the fuel gas supply channel 58, and the oxygen-containing gas inlet 214 formed in the first plate 196 is connected to the end of the oxygen-containing gas supply channel 234. The oxygen-containing gas inlet 214 and fuel gas inlet 80 are spaced to the left and right at equal intervals from the central line of the bridge 202.

Figure 30:
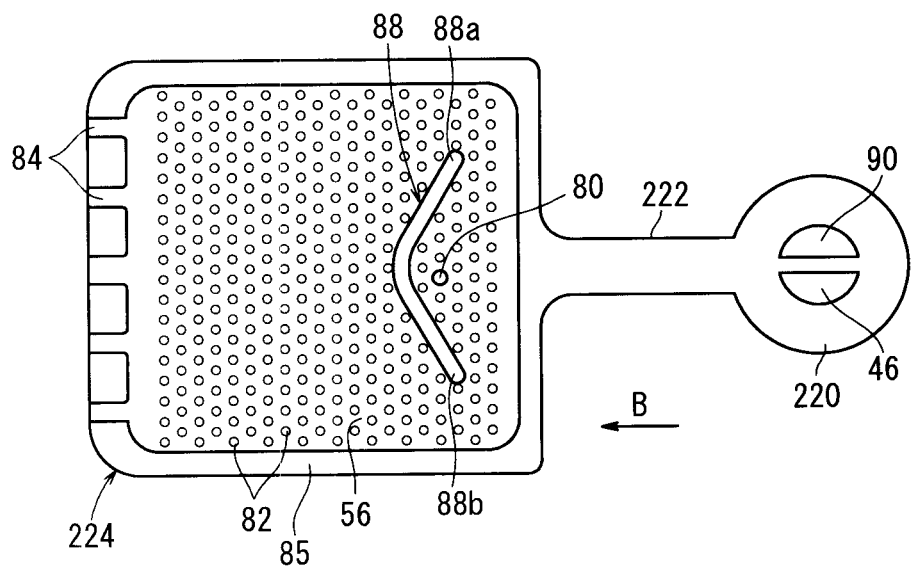
FIG. 30 is a view showing a second plate of the fuel cell.

As shown in FIG. 30, the second plate 198 has a fuel gas channel 56 formed by a plurality of projections 82 on its surface which contacts the anode 36. A plurality of fuel gas outlets 84 are formed at the front end of the second rectangular section 224. The opening area in cross section of the fuel gas outlets 84 and/or intervals between the fuel gas outlets 84 are determined in accordance with the principle of the present invention. As shown in FIG. 28, an insulating ring 92*a* is interposed in each space between the adjacent separators 194, and is sandwiched between the reactant gas supply sections 200. The insulating ring 92*a* functions as a seal for the fuel gas supply passage 46 and the oxygen-containing gas supply passage 90.

In the fifth embodiment, the fuel gas and the oxygen-containing gas flow in the stacking direction through the fuel gas supply passage 46 and the oxygen-containing gas supply passage 90 formed in the reactant gas supply section 200 of each separator 194. The fuel gas flows from fuel gas inlet 80 into the fuel gas channel 56 through the fuel gas supply channel 58 formed in the bridge 202. The fuel gas flows uniformly along the fuel gas channel 56 by the guidance of the detour path forming wall 88, and the fuel gas is supplied to the anode 36. The fuel gas after partially consumed is discharged from the fuel gas outlets 84 to the exhaust gas discharge passage 94.

The oxygen-containing gas flows through the oxygen-containing gas supply channel 234 formed in the bridge 202, and flows from the oxygen-containing gas inlet 214 to the oxygen-containing gas channel 54. The oxygen-containing gas flows uniformly along the oxygen-containing gas channel 54 under the guidance of the detour path forming wall 218, and the oxygen-containing gas is supplied to the cathode 34. The oxygen-containing gas after partially consumed is discharged from the oxygen-containing gas outlets 216 to the exhaust gas discharge passage 94.

In the fifth embodiment, the outer ridge 212 protrudes toward the oxygen-containing gas channel 54 to contact the outer edge of the cathode 34. In the structure, after the oxygen-containing gas is supplied from the oxygen-containing gas inlet 214 to the oxygen-containing gas channel 54, the oxygen-containing gas is blocked by the outer ridge 212. Blowing of the oxygen-containing gas to the outside is prevented. Thus, the oxygen-containing gas can be used effectively in the power generation reaction, and the gas utilization ratio of the oxygen-containing gas is improved suitably.

Further, it become possible to prevent the gases other than the oxygen-containing gas, such as the fuel gas and the exhaust gas from flowing around to the cathode 34 from the outside of the electrolyte electrode assembly 38. Thus, degradation in the power generation efficiency due to reduction at the cathode 34 is prevented. Improvement in the durability of the separator 194 and the electrolyte electrode assembly 38 can be achieved easily. Further, since the detour path forming wall 218 contacts the cathode 34, current collection can be performed desirably. Moreover, since the oxygen-containing gas flows around in the oxygen-containing gas channel 54, the oxygen-containing gas flows along the electrode surface of the cathode 34 over a long period of time, and the oxygen-containing gas can be utilized effectively in the power generation reaction. Accordingly, the air utilization ratio is improved effectively.

Further, the detour path forming wall 218 is bent in a V-shape toward the oxygen-containing gas inlet 214. In the structure, the number of the oxygen-containing gas inlets 214 requiring high precision production is reduced significantly and economically. As in the case of providing a plurality of the oxygen-containing gas inlets 214, the oxygen-containing gas is supplied uniformly along the electrode surface.

Further, at least one oxygen-containing gas inlet 214 is formed in the inner area of the V-shaped detour path forming wall 218. In the structure, since the oxygen-containing gas flows around in the oxygen-containing gas channel 54, the oxygen-containing gas flows over the electrode surface of the cathode 34 for a long period of time. Thus, the oxygen-containing gas can be utilized effectively for power generation reaction, and the air utilization ratio is improved suitably.

Further, both ends 218a, 218b of the detour path forming wall 218 are oriented toward the corners of the sandwiching section 204. In the structure, since the oxygen-containing gas flows around over the entire area of the oxygen-containing gas channel 54, the oxygen-containing gas flows over the entire area of the electrode surface of the cathode 34 for a long period of time. Thus, the oxygen-containing gas can be utilized effectively for power generation reaction, and the air utilization ratio is improved suitably.

Further, the cross sectional areas in the openings of the oxygen-containing gas outlets 216 become small or the intervals between the oxygen-containing gas outlets 216 are increased in directions away from the position intersecting the extension line of the bridge 202. Therefore, with simple and economical structure, the oxygen-containing gas can be supplied uniformly and suitably. Further, the same advantages as in the case of the first embodiment are obtained.

Figure 31:
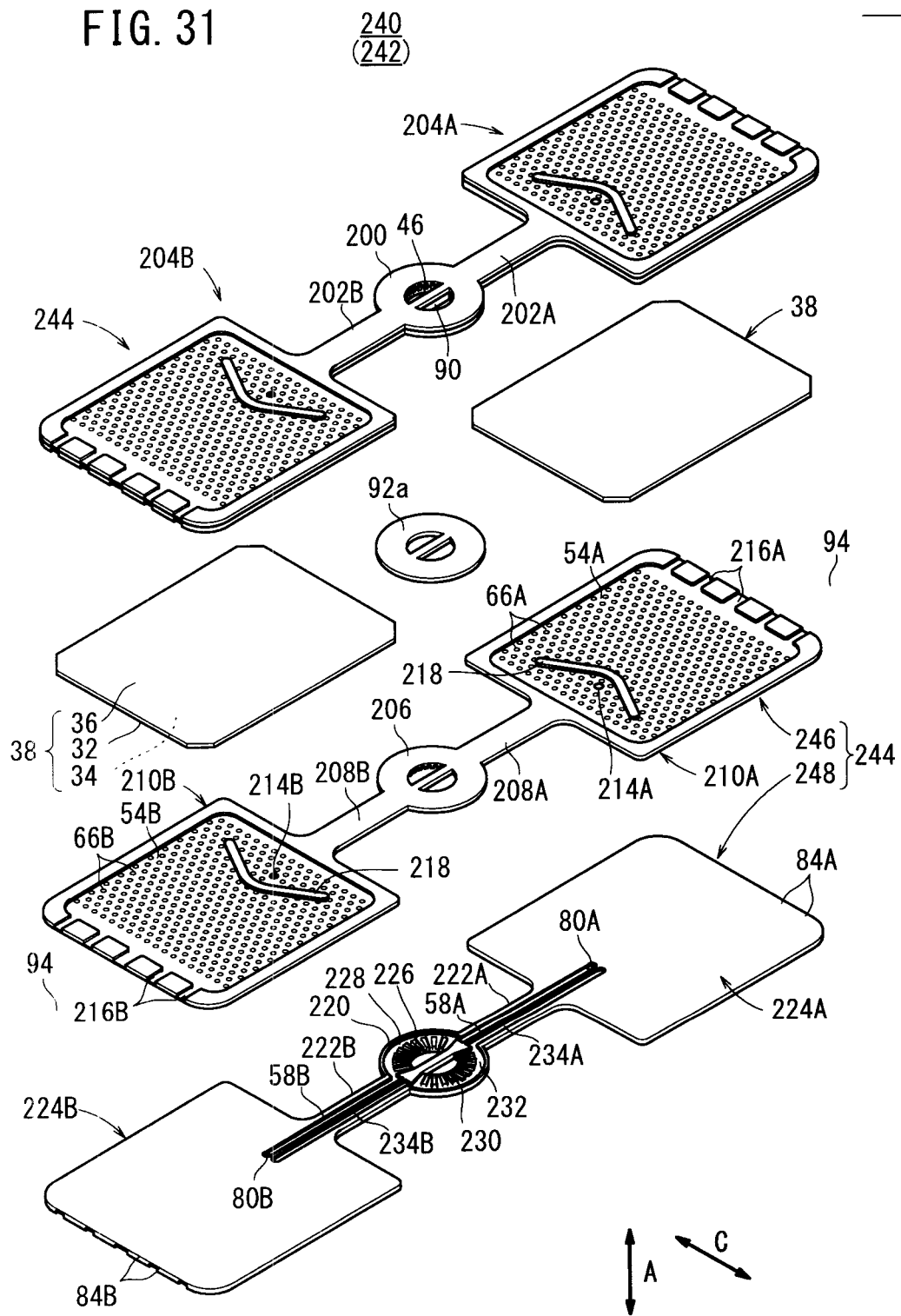
FIG. 31 is an exploded perspective view showing a fuel cell according to a sixth embodiment of the present invention.

FIG. 31 is an exploded perspective view showing main components of a fuel cell 240 according to a sixth embodiment of the present invention.

A plurality of the fuel cells 240 are stacked together to form a fuel cell stack 242. The fuel cell 240 includes a pair of separators 244 sandwiching two electrolyte electrode assemblies 38 in the same plane. The separator 244 includes a reactant gas supply section 200 and bridges 202A, 202B provided integrally with the reactant gas supply section 200. The bridges 202A, 202B extend from the reactant gas supply section 200 in opposite directions to each other. Sandwiching sections 204A, 204B each having a rectangular shape are provided integrally with the bridges 202A, 202B. The separator 244 includes a first plate 246 and a second plate 248.

The first plate 246 includes a first circular disk section 206 and first elongated plate sections 208A, 208B extending in opposite directions to each other from the first circular disk section 206. First rectangular sections 210A, 210B are provided integrally with the first elongated plate sections 208A, 208B. Oxygen-containing gas channels 54A, 54B are formed by a plurality of projections 66A, 66B in the first rectangular sections 210A, 210B. Oxygen-containing gas inlets 214A, 214B are provided at positions adjacent to the first circular disk section 206.

The plurality of oxygen-containing gas outlets 216A, 216B are formed at the front ends of the first rectangular sections 210A, 210B. The oxygen-containing gas outlets 216A, 216B are connected to the exhaust gas discharge passages 94. Detour path forming walls 218 are provided close to the oxygen-containing gas inlets 214A, 214B.

The second plate 248 includes a second circular disk section 220 and second elongated plate sections 222A, 222B extending in opposite directions to each other from the second circular disk section 220. Second rectangular sections 224A, 224B are provided integrally with the second elongated plate sections 222A, 222B. The fuel gas supply channels 58A, 58B and the oxygen-containing gas supply channels 234A, 234B are provided in parallel with each other in the second elongated plate sections 222A, 222B. Fuel gas inlets 80A, 80B are connected to front ends of the fuel gas supply channels 58A, 58B.

Figure 32:
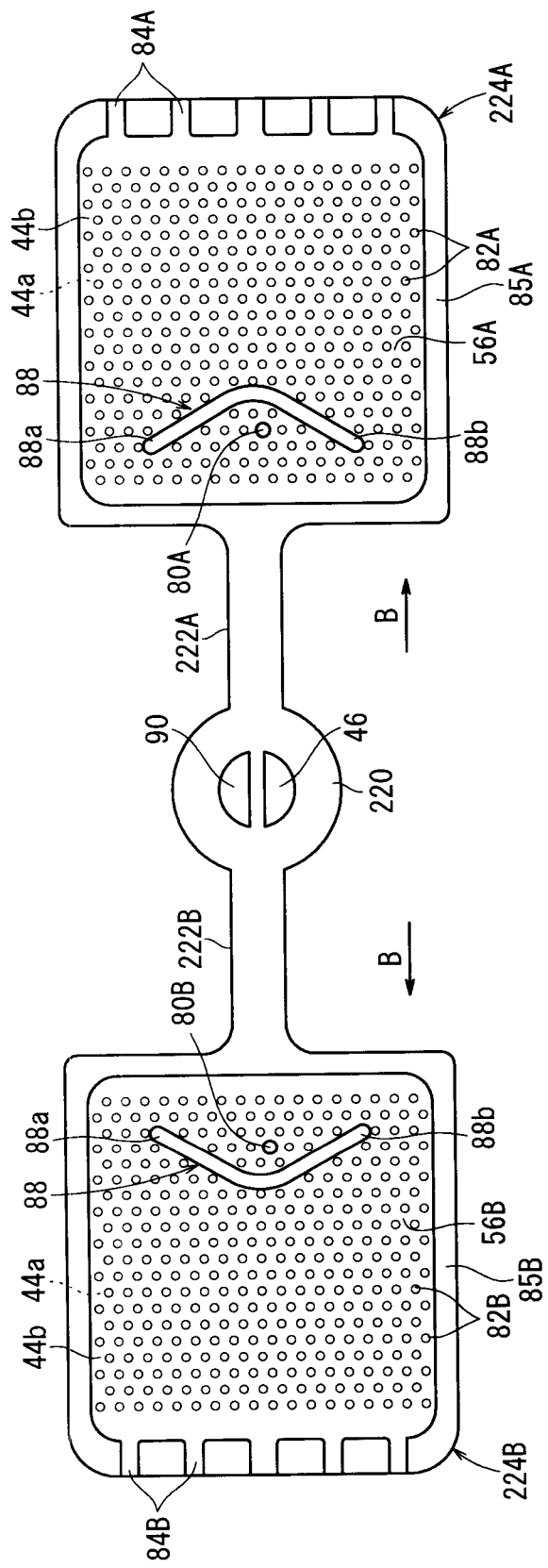
FIG. 32 is a view showing a second plate of the fuel cell.
Figure 33:
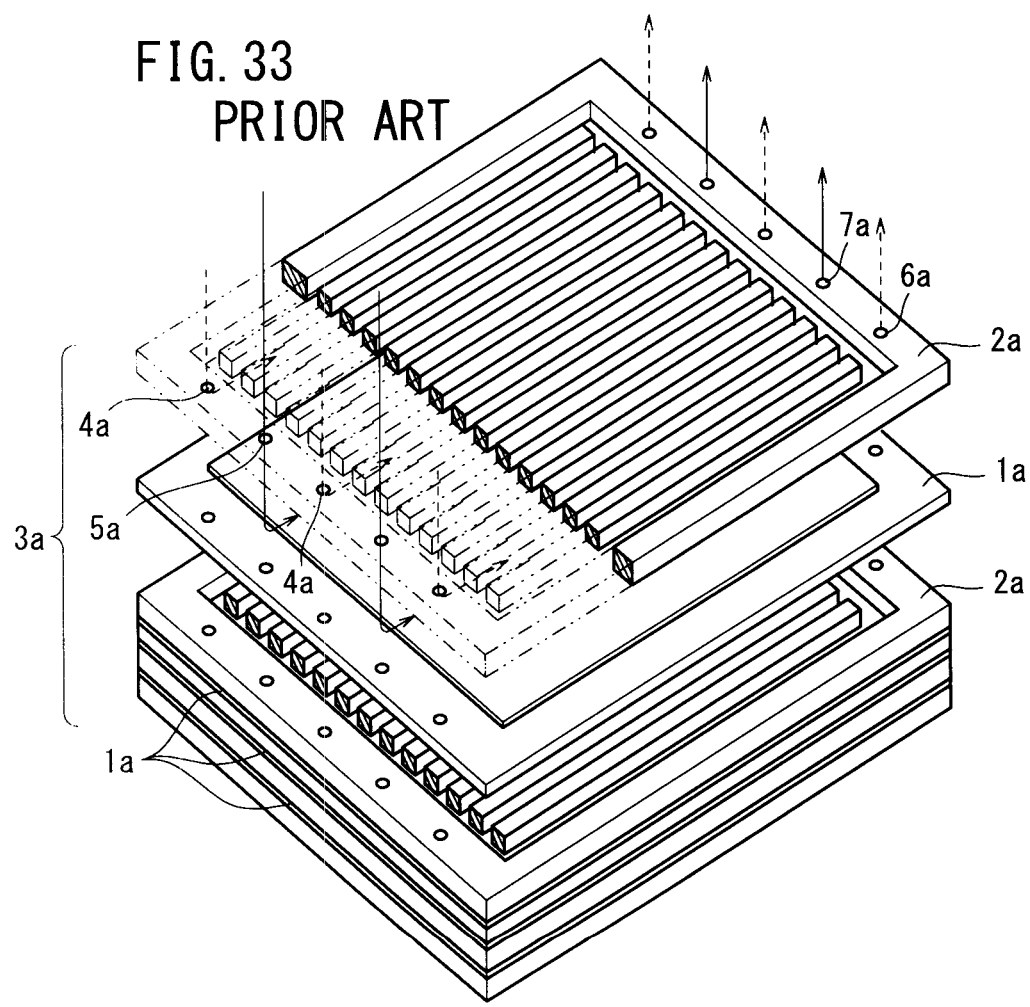
FIG. 33 is a perspective view showing a solid oxide fuel cell disclosed in Japanese Laid-Open Patent Publication No. 05-129033.
Figure 34:
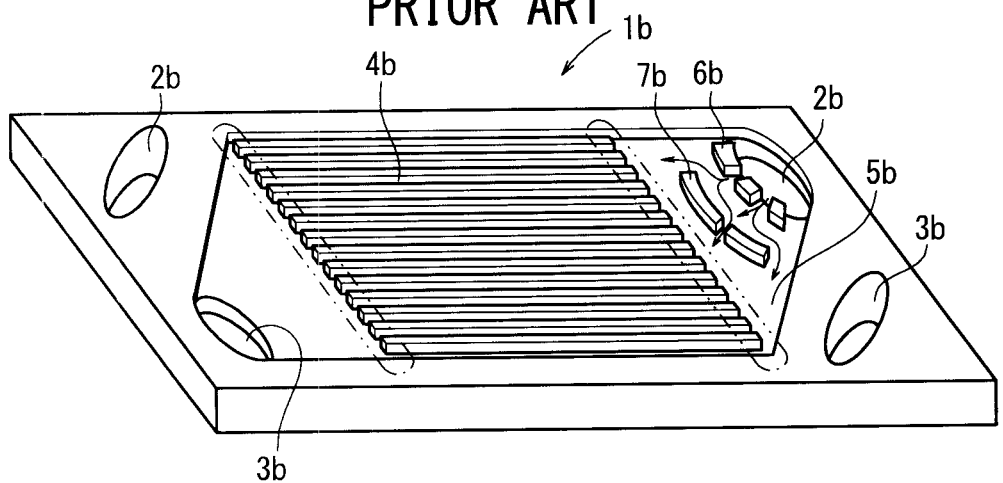
FIG. 34 is a perspective view showing a separator disclosed in Japanese Laid-Open Patent Publication No. 10-172594.
Figure 35:
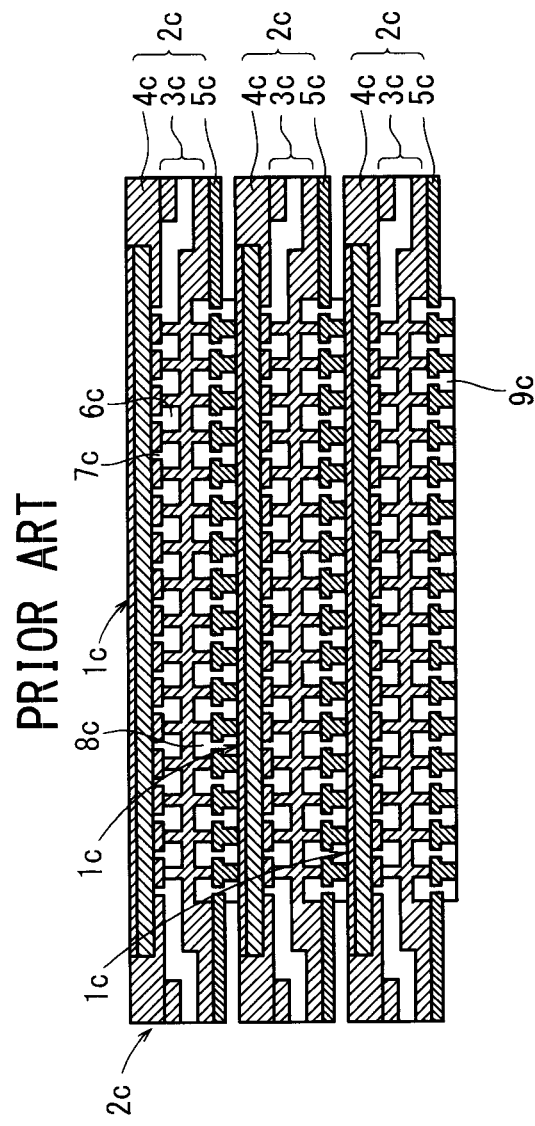
FIG. 35 is a cross sectional view showing a fuel cell disclosed in Japanese Laid-Open Patent Publication No. 2007-026925.

As shown in FIG. 32, fuel gas channels 56A, 56B are formed by a plurality of projections 82A, 82B in the second rectangular sections 224A, 224B. A plurality of fuel gas outlets 84A, 84B are provided in the outer ridges 85A, 85B, and detour path forming walls 88 are provided between the fuel gas outlets 84A, 84B and the fuel gas inlets 80A, 80B.

In the sixth embodiment, the two electrolyte electrode assemblies 38 are sandwiched between the separators 244. In the structure, the same advantages as in the case of the fifth embodiment are obtained. For example, increase in the output can be achieved.

While the invention has been particularly shown and described with reference to preferred embodiments, it will be understood that variations and modifications can be effected thereto by those skilled in the art without departing from the scope of the invention as defined by the appended claims.

The invention claimed is:

1. A fuel cell formed by stacking an electrolyte electrode assembly between separators, the electrolyte electrode assembly including an anode, a cathode, and an electrolyte interposed between the anode and the cathode, the separators each including:

a rectangular sandwiching section for sandwiching the electrolyte electrode assembly, the sandwiching section having a fuel gas channel for supplying a fuel gas along an electrode surface of the anode and an oxygen-containing gas channel for supplying an oxygen-containing gas along an electrode surface of the cathode separately;

a bridge connected to the sandwiching section, a reactant gas supply channel being formed in the bridge for supplying the fuel gas to the fuel gas channel or supplying the oxygen-containing gas to the oxygen-containing gas channel; and a reactant gas supply section connected to the bridge, a reactant gas supply passage extending through the reactant gas supply section in the stacking direction for supplying the fuel gas or the oxygen-containing gas to the reactant gas supply channel, the sandwiching section comprising:

at least one reactant gas inlet for supplying the fuel gas to the fuel gas channel or supplying the oxygen-containing gas to the oxygen-containing gas channel;

an outer ridge protruding toward the fuel gas channel to contact an outer edge of the anode or protruding toward the oxygen-containing gas channel to contact an outer edge of the cathode;

a reactant gas outlet for discharging the fuel gas after partially consumed in the fuel gas channel or discharging the oxygen-containing gas after partially consumed in the oxygen-containing gas channel; and at least one detour path forming wall contacting the anode or the cathode, the detour path forming wall being positioned between the reactant gas inlet and the reactant gas outlet and bent in a V-shape toward the reactant gas inlet for preventing the fuel gas or the oxygen-containing gas from flowing straight from the reactant gas inlet to the reactant gas outlet, wherein at least one reactant gas inlet is provided in a V-shaped inner area of the at least one detour path forming wall, and wherein an extension line from at least one end of the at least one detour path forming wall is oriented toward a corner of the sandwiching section.

2. The fuel cell according to claim 1, wherein a bending angle between V-shaped wall surfaces of the at least one detour path forming wall becomes large as the distance between the reactant gas inlet and the reactant gas outlet becomes large.

3. The fuel cell according to claim 1, wherein the reactant gas outlet is formed along one side of the sandwiching section intersecting an extension line of the bridge.

4. The fuel cell according to claim 1, wherein a plurality of the reactant gas outlets are formed along one side of the sandwiching section intersecting an extension line of the bridge;
   cross sectional areas in openings of the reactant gas outlets become small in a direction away from a position intersecting the extension line of the bridge.

5. The fuel cell according to claim 1, wherein a plurality of the reactant gas outlets are formed along one side of the sandwiching section intersecting an extension line of the bridge; and
   intervals between the reactant gas outlets become large in a direction away from a position intersecting an extension line of the bridge.

6. The fuel cell according to claim 1, wherein a pair of the bridges are connected to the reactant gas supply section, and the pair of bridges extend in opposite directions from the reactant gas supply section; and
   the sandwiching sections are connected to the pair of bridges symmetrically with respect to the reactant gas supply section.

7. The fuel cell according to claim 1, wherein the fuel cell is a solid oxide fuel cell.

\* \* \* \* \*